US 9,336,451 B2

(12) United States Patent
Boghossian et al.

(10) Patent No.: US 9,336,451 B2
(45) Date of Patent: May 10, 2016

(54) VIDEO SURVEILLANCE AND ANALYTICS SYSTEM

(75) Inventors: Boghos Boghossian, London (GB); James Black, London (GB); Sateesh Pedagadi, London (GB)

(73) Assignee: IPSOTEK LTD., London (GB)

( * ) Notice: Subject to any disclaimer, the term of this patent is extended or adjusted under 35 U.S.C. 154(b) by 525 days.

(21) Appl. No.: 13/810,655

(22) PCT Filed: Jul. 19, 2011

(86) PCT No.: PCT/GB2011/051362
§ 371 (c)(1),
(2), (4) Date: Apr. 29, 2013

(87) PCT Pub. No.: WO2012/010887
PCT Pub. Date: Jan. 26, 2012

(65) Prior Publication Data
US 2013/0208124 A1    Aug. 15, 2013

(30) Foreign Application Priority Data

Jul. 19, 2010    (GB) .................................. 1012095.4

(51) Int. Cl.
*H04N 7/18*    (2006.01)
*G06K 9/32*    (2006.01)
(Continued)

(52) U.S. Cl.
CPC .......... *G06K 9/3241* (2013.01); *G06K 9/00771* (2013.01); *G06T 7/208* (2013.01); *G06T 7/2033* (2013.01); *G08B 13/19645* (2013.01);
(Continued)

(58) Field of Classification Search
CPC ......... H04N 7/181; H04N 7/18; H04N 7/183;
H04N 7/188; G06K 9/3241; G06K 9/00771;
G08B 13/19645; G06T 2207/30241; G06T
7/208; G06T 2207/10016; G06T 2207/30232;
G06T 7/2033
USPC .......... 348/143, 144, 151–156, 169; 382/103
IPC ....................................................... H04N 7/18
See application file for complete search history.

(56) References Cited

U.S. PATENT DOCUMENTS 8,472,672 B2 *   6/2013   Wang ................. G06K 9/00771
                                                                 348/169

FOREIGN PATENT DOCUMENTS

EP           1 927 947 A1      6/2008
JP           2004187115 A      7/2004
WO      WO 2005/081127 A2     9/2005

OTHER PUBLICATIONS

Zhou, H. et al., "Metadata Extraction and Organization for Intelligent Video Surveillance System", Proceedings of the 2010 IEEE International Conference on Mechatronics and Automation (ICMA), Aug. 4-7, 2010, p. 489-494, ISBN 978-1-4244-5141-8.

(Continued)

*Primary Examiner* — Sherrie Hsia
(74) *Attorney, Agent, or Firm* — Fenwick & West LLP

(57) ABSTRACT

An apparatus is disclosed which is operative to analyze a sequence of video frames of a camera view field to track an object in the view field and determine a temporal relationship start and end points of track in view field. The apparatus also determines a sequence of video frames of a plurality of surveillance network camera view fields to track an object in respective view fields and store respective start and end points and start and end times as attributes of each said track for respective view fields.

17 Claims, 17 Drawing Sheets

(51) Int. Cl.
  *G06T 7/20* (2006.01)
  *G08B 13/196* (2006.01)
  *G06K 9/00* (2006.01)

(52) U.S. Cl.
  CPC ...... *H04N7/181* (2013.01); *G06T 2207/10016* (2013.01); *G06T 2207/30232* (2013.01); *G06T 2207/30241* (2013.01)

(56) References Cited

OTHER PUBLICATIONS

Makris, D. et al., "Bridging the Gaps Between Cameras," Proceedings of the 2004 IEEE Computer Society Conference on Computer Vision and Pattern Recognition, 2004, pp. 1-6.

Stauffer, C. et al., "Adaptive Background Mixture Models for Real-Time Tracking," IEEE Computer Society Conference on Computer Vision and Pattern Recognition, IEEE, 1999, 7 pages, vol. 2.

Yilmaz, A. et al., "Object Tracking: A Survey," ACM Computing Surveys, Dec. 2006, pp. 1-45, vol. 38, No. 4, Article 13.

Javed, Omar, et al., "Modeling Inter-Camera Space-Time and Appearance Relationships for Tracking Across Non-Overlapping Views," Computer Vision and Image Understanding, Jan. 10, 2008, vol. 109, No. 2, pp. 146-162, Academic Press, US.

Sheikh, Yaser Ajmal, et al., "Trajectory Association Across Multiple Airborne Cameras," IEEE Transactions on Pattern Analysis and Machine Intelligence, Feb. 1, 2008, pp. 361-367, vol. 30, No. 2.

Zelniker, Emanuel E., et al., "Global Abnormal Behaviour Detection Using a Network of CCTV Cameras," The Eighth International Workshop on Visual Surveillance—VS2008, Sep. 29, 2008, 8 pages.

PCT International Search Report for PCT/GB2011/051362, Aug. 31, 2011, 4 pages.

* cited by examiner

● Approximate Camera Location

◀ Approximate Camera View

VIDEO SURVEILLANCE AND ANALYTICS SYSTEM

BACKGROUND

1. Field of Art

The present invention relates to apparatus for analyzing a sequence of video frames, a system utilizing such apparatus and a method of operating such apparatus and system. In particular, but not exclusively, embodiments of the present invention relate to video surveillance networks.

2. Description of Related Art

Video surveillance networks comprise one or more video cameras arranged to provide surveillance of a particular geographical location. The network may simply comprise a single video camera monitoring a portal which, for example, may be a door, a corridor, a lift, an entrance hall, an exit hall, a concourse, an airport security gate or anywhere there may be numerous individuals passing through. In some cases, such as an entrance hall for a large shopping center or a departures hall of an airport, there may be thousands of people passing through in a relatively short space of time. This makes tracking individuals who may be considered to be a threat or of interest to security in such cases fraught with difficulty.

Generally, video surveillance networks comprise a plurality of video cameras arranged to provide surveillance over a distributed geographical location such as an urban environment. Each video camera has a particular field of view or "view field" over which it captures and may record video images. A video camera may be static or may be remotely controllable to move its view field over the area under surveillance. A video image for a view field at a particular time is often termed a "scene" and may correspond to a frame of a video image captured by a camera.

Cameras in a network may be linked to a control center over a communications network using, for example, Internet protocol-based communications. Optionally, cameras may be linked to a control center via a dedicated analogue or digital communications channel. Control centers are usually manned by human operators, even when there are automated alert responses to particular scenarios within the network. The human operator needs to observe a camera which is showing a relevant incident, for example a scenario which has generated an alert. In networks comprising many cameras, the operator cannot monitor all the cameras, even when each camera has a dedicated display screen in the control center.

Additionally, many video surveillance networks cover a wide geographic area and may have non-overlapping or non-contiguous view field coverage. Additionally, cameras may cover crowded areas and may include objects which are occluded by other objects, for example static occlusions where an urban feature occludes a portion of a street thereby occluding pedestrians and vehicles passing behind the urban feature or where pedestrians are occluded by each other such as in crowded environments.

Monitoring such video surveillance networks may be highly complex, resulting in it being difficult to observe an incident and/or track activities leading up to an incident or following on from an incident.

SUMMARY

Aspects and embodiments of the present invention were devised with the foregoing in mind.

Viewed from a first aspect, the present invention provides apparatus operative to analyze a sequence of video frames of a camera view field to track an object in said view field; determine start and end points of the track in said view field; determine a start and end time for the said track corresponding to said start and end points respectively; and store said start and end points and said start and end times as attributes of said track.

A "track" in the context of a camera field of view may be a combination of location, time and appearance details defining the presence of an object. Such a track exists for an object until it disappears from the scene completely or satisfies a condition set for the termination of track(s). A second aspect of the present invention provides a method of operating data processing apparatus, comprising: analyzing a sequence of video frames of a camera view field to track an object in said view field; determining start and end points of said track in said view field; determining a start and end time for the said track corresponding to said start and end points respectively; and storing said start and end points and said start and end times as attributes of said track.

Embodiments in accordance with the first and second aspects operate on video image data in the sequence of video frames to reduce the behavior or path of an object such as a person or vehicle present in the sequence of video frames to a metadata format that is lower bandwidth, for example just four simple data points, which allows for easy searching. That is to say, the behavior of an object in the sequence of video frames is reduced to just data defining where the object starts and ends in the sequence and at times corresponding to the starting and ending points. This substantially reduces the amount of data storage space required to store information on the behavior of the object and also reduces the amount of processing necessary if the behavior of the object is to be used in data analysis.

Typically, one or more embodiments may operate on a sequence of video frames of a plurality of surveillance network camera view fields to track an object in respective view fields and store respective start and end points and start and end times as attributes of each said track for respective view fields. For example, in a surveillance network covering a large geographic area such as a town center, warehouse depot or other such facility, a plurality of video cameras would be utilized.

Suitably, one or more embodiments may determine a temporal relationship between an end time of a track in a first view field and a start time of a track in a second view field and based on said temporal relationship, determine a likelihood value of a transition of said track in said first view field to said track in said second view field. The likelihood value is then stored. To the extent that such a difference exists, the likelihood value may be a probability value. Determining a likelihood value of a transition between tracks in the first and second views provides for an embodiment in which the transitions may be ranked in terms of their likelihood. Thus, it may be possible to discard or ignore transitions which have a low likelihood. This may be particularly important in terms of reducing data processing overheads and analyzing data are relying upon the transitions between first and second view fields since less likely transitions may be ignored and no data-processing is conducted on them. Furthermore, since the operation is conducted on metadata-defined correspondence between tracks in different view fields, rather than on video frames, less processing is required.

The temporal relationship may be based upon a spatial relationship in physical space between a start point corresponding to said start time and an end point corresponding to said end time. Such a spatial relationship is typically the distance along a road or pavement between exit and entry zones and may be defined in the system as a system parameter.

More particularly, an embodiment in accordance with the present invention may track plural objects in said first and second view fields and determine corresponding plural start and end points; determine start and end zones for said first and second view fields based on said plural start and end points; determine said temporal relationship between an end zone of a track in said first view field and a start zone of a track in said second view field; and based on said temporal relationship determine said likelihood value of a transition of said track in said first view field to said track in said second view field. Thus, there is defined an area in which an object may appear or disappear from a view field which provides for a simpler identification of exit and entry zones.

Typically, the temporal relationship is based upon a spatial relationship in physical space between said start zone and said end zone.

Typically, more embodiments respond to tagging of a said object in said first view field to determine one or more tracks having start times in said second window satisfying said temporal relationship and display said one or more tracks to a user.

In particular, one or more embodiments determine an appearance of a said object as an attribute of said object and to compare the appearance attribute of each object corresponding to said one or more tracks to determine a probability value for each object being the tagged object and to rank said one or more tracks in accordance with said probability value. Using a descriptor such as the appearance of an object for comparison purposes, rather than the actual object image, makes the comparison process more efficient since there are less data points to compare.

Suitably, only the most likely tracks are displayed which reduces the time a human operator would take to analyze all possible video footage where an individual could be present by displaying only the likely routes where the individual may have gone.

More suitably, one or more embodiments select a correct track responsive to user input confirming a one of said one or more tracks as a correct track. Thus, more embodiments may be configured to receive user feedback to further improve the tracking of an individual object.

A third aspect of the present invention provides apparatus operative to display a network map of camera locations and a scene for a first camera view field; respond to a user tagging an object in said scene to: determine other view fields of cameras in said network in which the tagged object may possibly appear based on a possible object in said other view fields satisfying a temporal and spatial relationship between exit and/or entry points in said first camera view field and an entry and/or exit point for said other view fields; and display possible routes in said network between camera locations for which a said temporal and spatial relationship is satisfied.

A fourth aspect of the present invention provides a method of operating data processing apparatus comprising: displaying a network map of camera locations and a scene for a first camera view field; responding to a user tagging an object in said scene to: determine other view fields of cameras in said network in which the tagged object may possibly appear based on a possible object in said other view fields satisfying a temporal and spatial relationship between exit and/or entry points in said first camera view field and an entry and/or exit point for said other view fields; and display possible routes in said network between camera locations for which a said temporal and spatial relationship is satisfied.

One or more embodiments in accordance with the third and fourth aspect of the present invention provides a tool to allow a human operator access to data generated by a tag and track system and to intuitively navigate through the video and tag individual objects of interest. Furthermore, the use of such tags may assist in reducing the amount of video that needs to be manually analyzed in order to track an individual object through the surveillance area.

Typically, one or more embodiments determine other view fields in which said tagged object may appear based on a similarity of appearance of metadata between said possible object and said tagged object. This provides a further method of determining the likelihood that an object may correspond to a tagged object.

Suitably, one or more embodiments display an indication of the probability that a displayed route corresponds to a route taken by said tagged object which provides useful feedback to a human operator. In particular, the most probable route is highlighted.

One or more embodiments may be configured to respond to a user's selection of a camera location corresponding to said other view field to display a video scene in which said possible object is present. Thus, a user may quickly move between video scenes of interest. While in a video scene, a user may select said possible object to confirm said possible object as said tagged object and confirm routes leading to said camera location and delete other routes.

More suitably, one or more embodiments calculate further possible routes based on temporal and spatial relationships, and optionally appearance metadata, to and from said camera location for said tagged object and display said possible routes.

Even more suitably, more embodiments display up to only a certain number of possible routes corresponding to those with the highest possibility, and optionally display up to only a certain number of connections between camera locations, thereby further reducing the amount of work a human operator has to do. Typically, four links in any one direction are shown thereby reducing video clutter.

The certain number may be user-settable such that the display can be configured to a user's preference.

A scene slider control may be provided which is user actuable to slide back and forth to move a video scene backwards or forwards. This allows the user to control what part of the video to review.

More embodiments may display one or more bookmarks along a displayed time line to indicate where an object entered or left the view field corresponding to a displayed said scene. Bookmarks allow the operator to have a very quick idea of the time span over which a possible candidate object has been visible in the camera view field they are observing, which could then influence the navigation through the map or the selection of objects for confirmation.

A bounding box may be displayed around objects having metadata such as entry and exit points associated therewith to assist in their identification. Typically, more embodiments highlight a possible object with a bounding box of different highlight attributes to objects not categorized as possible objects and to highlight a confirmed object with a bounding box of different highlight attributes to objects not categorized as a confirmed object.

In order to provide a record of the surveillance and tagging activity, one or more embodiments may be configured to generate a report of a tagged object's route through said network map.

DETAILED DESCRIPTION

Overview

Figure 1:
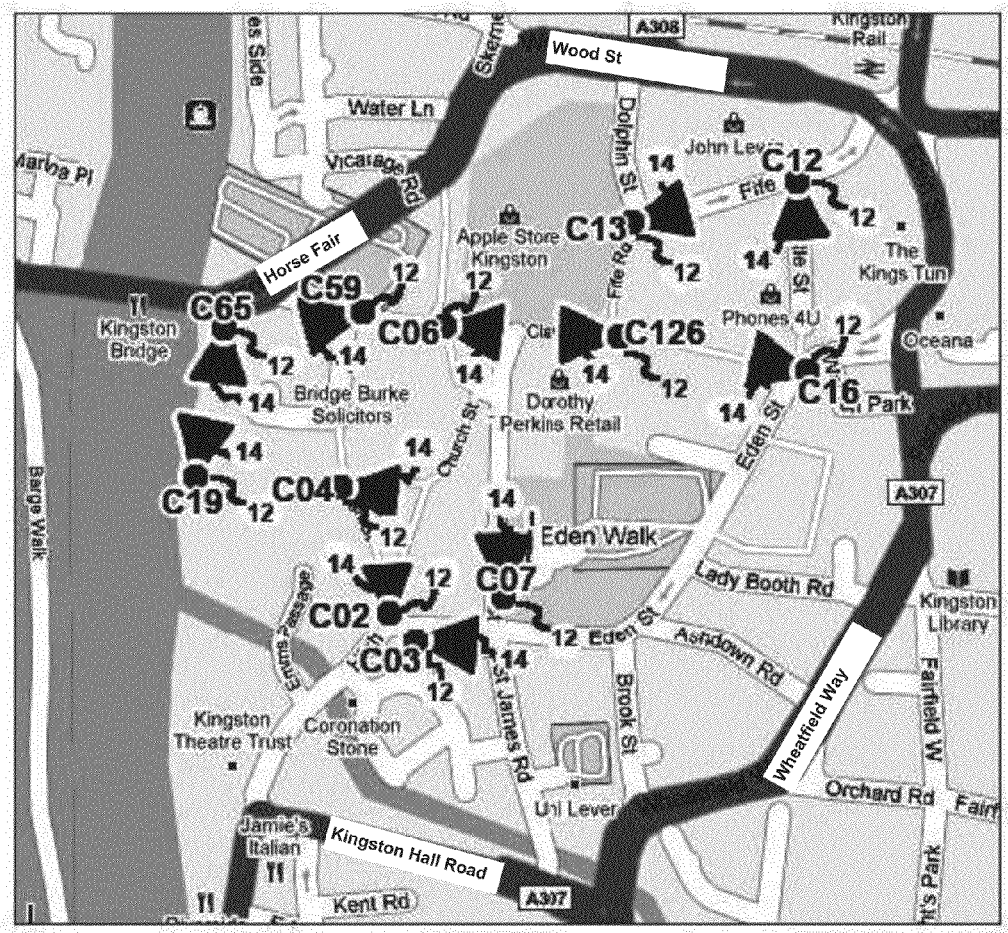
FIG. 1 is an illustration of a map of an urban area showing the location of cameras in a surveillance network.

A map 10 showing the location 12 of individual cameras in a video surveillance system in an urban area is illustrated in FIG. 1. The view field 14 of each camera is indicated by a triangle having an apex located at the camera location and extending therefrom. As can be seen from the identified camera view fields 14, there are gaps between the camera view fields resulting in non-contiguous video surveillance of the illustrated urban area. This does not exclude the application of the system to contiguous video surveillance by the provision of a sufficient number of cameras.

Figure 2:
FIG. 2 is an illustration of a scene in a view field of a camera in the surveillance network illustrated in FIG. 1.

A typical scene for a camera, in this case camera C07, is illustrated in FIG. 2 and shows a vehicle 15, a pedestrian crossing a road 16, a pedestrian pulling a trolley 17, a pedestrian walking along the pavement 18 and a pair of pedestrians very close together 19. The pair of pedestrians 19 are suffi-ciently close together that they may appear to a video analytics system as being a single object.

Figure 3:
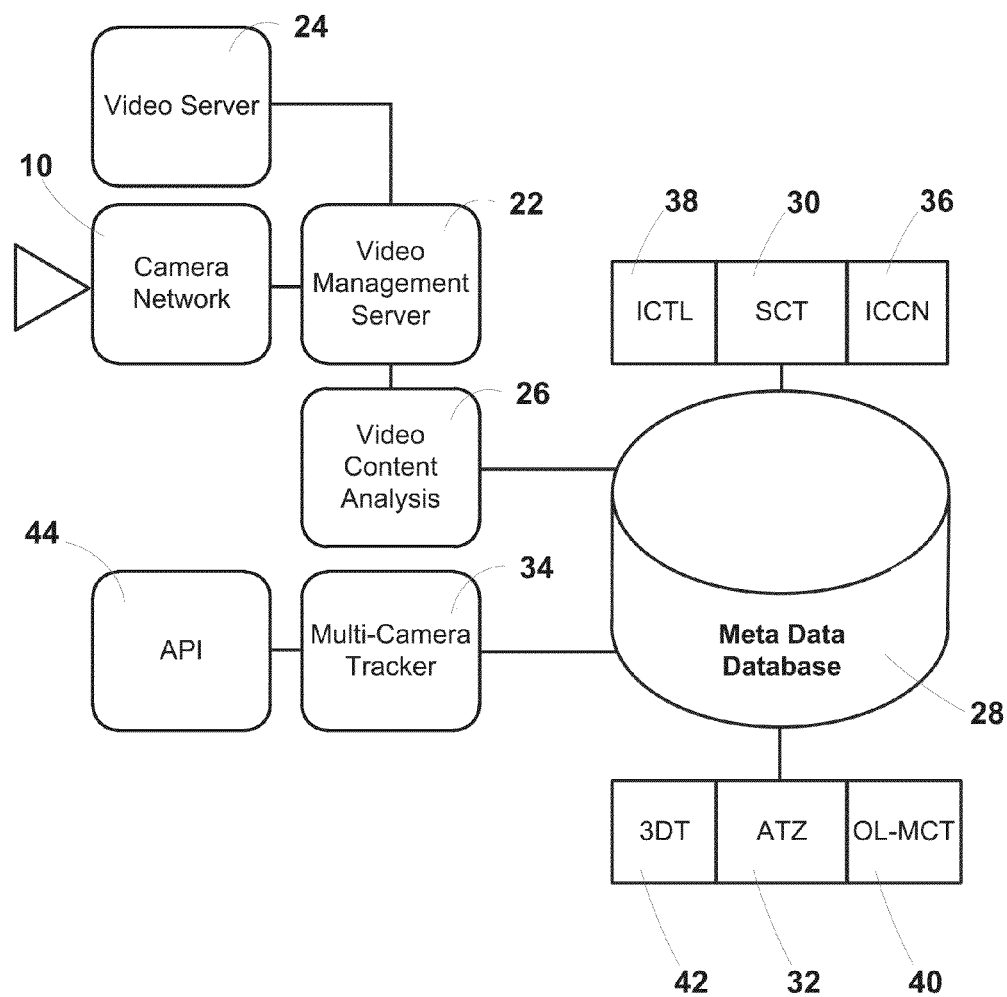
FIG. 3 is a schematic illustration of a surveillance system in accordance with an embodiment of the present invention.

Referring now to FIG. 3, there is illustrated a surveillance system 20 including a video camera network 10. The video camera network 10 may be part of an IP network over which the cameras send data, for example video data, to a control center, or may comprise direct connection (wired or wireless) between the video cameras and a control center. The video camera network 10 may have some cameras connected to an IP network and some connected via direct connection to the control center.

The video cameras in the video camera network 10 may also have other sensory equipment attached to them.

The video surveillance system 20 includes a video management server 22, which handles the video data received from the different cameras in the video camera network 10. An example of such a video management server is the Universal Video Management System provided by BAE Systems Integrated System Technologies Ltd, Surrey UK. The video management server 22 manages the archiving and storage of video data together with providing live video data feeds. Additionally, the video management server 22 may provide a search interface for requesting, identifying and returning video data in response to a search request. Also, the video management server 22 may interface with other technologies and applications.

A video server 24 for bulk storage of video image data is coupled to the video management server 22 which stores video image data on the video server 24 and retrieves video image data from the video server 24. The video management server 22 is interfaced to a video content analysis module 26. In the described embodiment, the video content analysis model 26 has one video content analysis channel for each camera in the video camera network 10. Video image data corresponding to each camera in the video camera network 10 may be supplied to the video content analysis model 26 from the video management server 22, for example, stored or archived video image data or video image data supplied over an IP network. Optionally, video image data may be directly fed to the video content analysis module 26 from the video camera network 10. The video image data may be in any suitable format, for example: MPEG2, MPEG3, MPEG4, H264, or any proprietary video format (IP Camera Manufacturer) with a suitable codec to allow video data to be decoded from the video stream or direct video from the cameras in analog format.

The system design is scalable in terms of the number of video management servers and video content analysis modules.

Typically, a synchronization signal is exchanged between the video management server 22 and the video content analysis module 26 in order to synchronize video data from the video management server 22 with video data supplied directly to the video content analysis module 26. Such synchronization may be necessary since the signal processing in the video management server 22 may introduce time delays relative to video received directly from the video camera network 10. Advantageously, the video data signal quality received by the video content analysis module 26 directly from the video camera network 10 may be higher than that for video data received from the video management server 22 since it will not have undergone data compression and decompression.

The video content analysis module 26 analyzes video image data to identify foreground objects such as vehicles and pedestrians in the video images and assigns to those objects attributes identifying them and describing their behavior and path in the camera view field. Such attributes may be regarded as "object metadata" since they comprise information about the objects.

It is also possible to select a subset of the tracks observed in the scene which may make the system more efficient rather than track objects that are not of interest, as searching through all objects would require considerably higher amounts of computation compared to searching through those objects that are selected as being of interest.

The process of generating reliable metadata or track information may be achieved by establishing a set of rules for objects appearing within each camera field of view via an intuitive user interface which is specific to video content analysis module 26. The rules describe the intended behavior and all objects exhibiting such behavior are reported in the metadata. Rules may be characterized by low-level attributes or high level attributes. Low level attributes of the object may be size, color, speed. High-level attributes may be termed as "actions" that objects might undertake once they appear in the camera field of view. Examples of actions include "An object within a defined area in the image." A combination of low-level and high-level attributes in a rule will further enhance the chances of refining the metadata which can sometimes be specific to a scene.

These attributes are stored in the metadata database 20 which does not store the video image data but only metadata in terms of attributes assigned to foreground objects. The video image data is stored in the video server 24.

Prior to the process of defining the detection rules in the video content analysis module 26, the metadata database is prepared so that it adheres to a pre-defined relational database schema. The metadata database is a networking component and hence will not impose restrictions in terms of the proximity of the video analysis module 26.

Once the rule setup process is completed in the video analysis module 26, a metadata population agent, for example, VIRobot, is configured to interface with the video analysis module at the input and the metadata database 28 at the output respectively. The functionality of VIRobot is to receive the metadata generated by the video content analysis module(s) 26 and translate such metadata into the metadata database 28, specifically format it according to a high-level or low-level attribute and store it for future use.

Two modes of metadata reporting can be supported by VIRobot. One is to store metadata from all the cameras on a frame by frame basis which is stored in the "observations" table in the metadata database 28. The second option is to report metadata on per object basis, i.e., to accumulate information of an object's track in real time and update the attributes of the track at regular intervals until such time that the object's track is terminated by the video content analysis module 26. This information is stored in the "tracklets" table of the metadata database 28.

The context of using one of the modes is decided by the presence of a video management server module in the tag and track system. If a video server management module does exist in the system, the bounding boxes identifying objects at a specific point in time within a camera are queried by the user interface via the application programming interface. A multi camera tracker module receives such query requests and sends the reply to the user interface with all the bounding boxes which are then overlayed in the video window view to allow the user to tag an object/person.

The video content analysis module 26 is coupled to a metadata database 28 and sends metadata to the metadata database 28 for storage. Various modules operate on or use the metadata stored in the metadata database 28 to further identify behavior or track foreground objects characterized by the metadata.

The various modules coupled to the metadata database 28 include a single camera tracker module 30, an automatic topology learner module 32, a multi-camera tracker module 34, and inter camera color normalization module 36, an intra-camera topology learning module 38, an off-line-multi-camera tracker module 40 and a 3D topology module 42. An application programming interface 44 is coupled to the multi-camera tracker module 34. The operation of each of the various modules will be described in more detail later.

Figure 4:
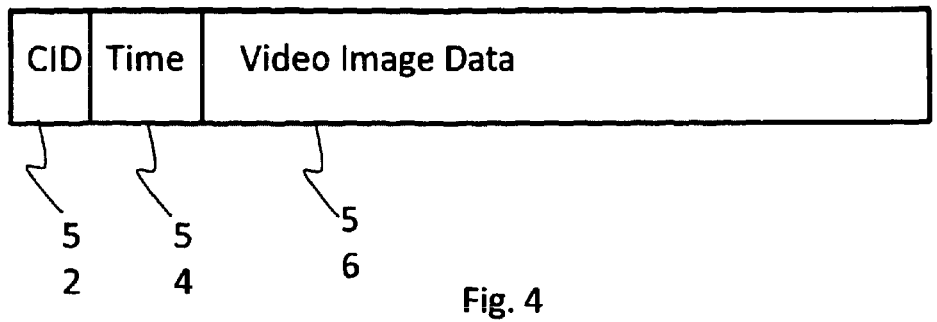
FIG. 4 is a diagrammatic representation of a video data element.

A diagrammatic illustration of a video image data element 50 processed in the video management server 22 is shown in FIG. 4. Such video image data elements 50 are transferred from the video management server 22 to the video content analysis module 26 for content analysis. The video image data element 50 comprises a camera identity 52, a time stamp 54 (which is incremented on a frame by frame basis) and video image data 56 for the video frame corresponding to the time stamp 54 and camera identity 52.

Figure 5:
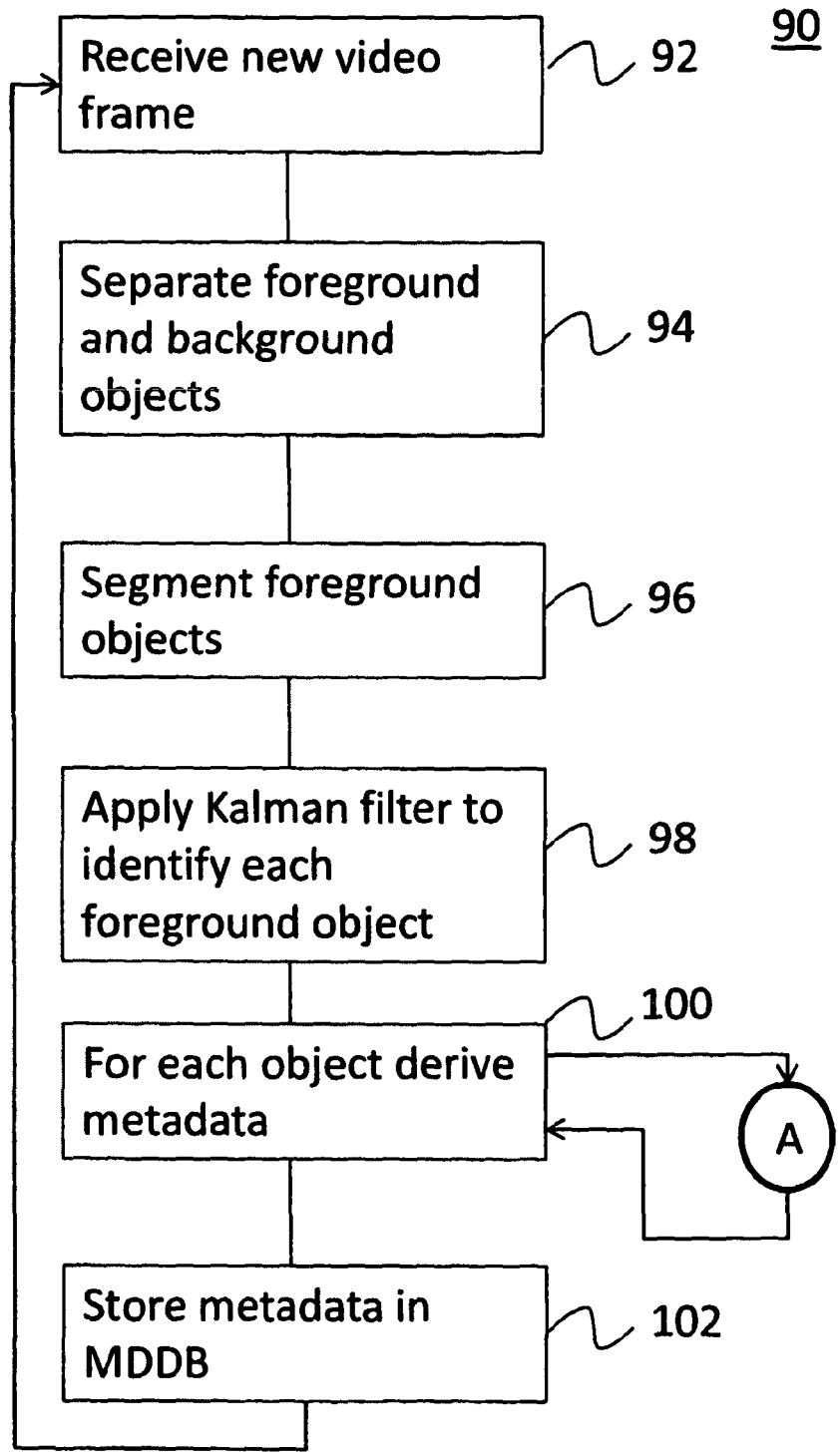
FIG. 5 is a process control flow diagram for a video content analysis module in accordance with an embodiment of the present invention.

The video content analysis module 26 is implemented on data processing apparatus such as a computer. As is well known in the art, the data processing apparatus may comprise plural processing resources including processor modules, memory modules and other processing resources, and data processing may be carried out on one or more of such processing resources. Furthermore, the data processing apparatus may be distributed across different physical locations and some processing resources may even be geographically distant from other processing resources. An implementation of the video content analysis module 26 on a data processing apparatus will now be described with reference to the process flow control diagram 90 illustrated in FIG. 5.

The video content analysis module 26 receives a video image data element 50 from the video management server which is input to the video content analysis channel corresponding to the camera identity 52. The video content analysis module 26 extracts the video image data 56 from the video image data element 50 to obtain a new video frame, step 92. The video content analysis module 26 tracks objects within a camera view field, and any suitable tracking algorithm may be utilized. Tracking begins at step 94 where the foreground and background objects in the video frame are separated and the foreground objects are segmented to separate them from each other, step 96. Examples of techniques for separating background and foreground objects and segmenting foreground objects may be found in "Adaptive background mixture models for real-time tracking", Chris Stauffer, Proceedings IEEE Conf. on Computer Vision and Pattern Recognition, pp. 246-252, 1999.

Figure 6:
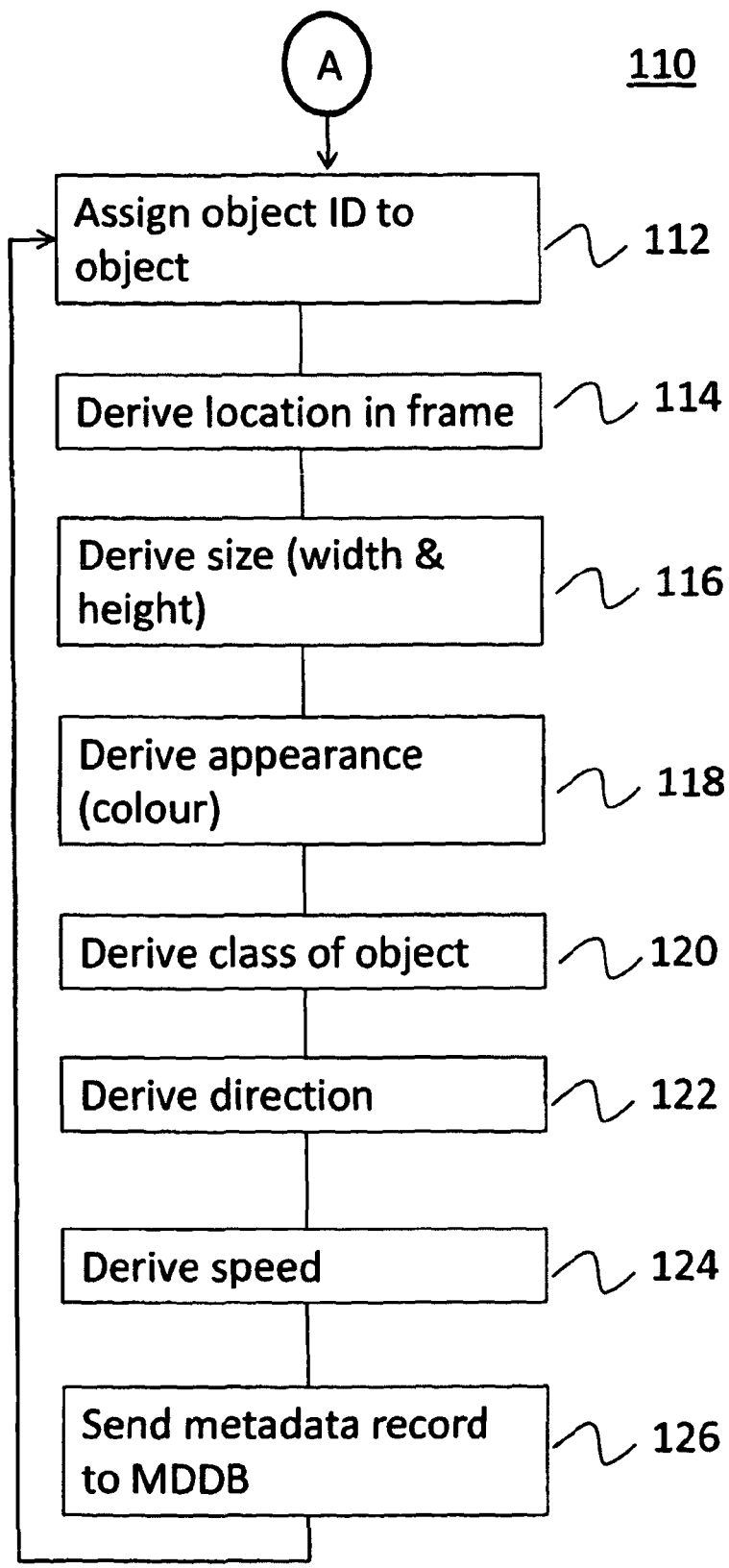
FIG. 6 is a process control flow diagram for the derivation of metadata in accordance with an embodiment of the present invention.

At step 98, a Kalman filter is applied to track each foreground object while visible in the camera view. The object is then filed and maintained a with a unique ID. For each foreground object, the video content analysis module 26 applies a metadata generator process 110 to the object in order to generate attributes of the object which serve as a description of that object. The metadata generator process 110 will be described with reference to the process flow control diagram illustrated in FIG. 6 of the drawings.

The metadata generator process 110 assigns an object ID to the object undergoing metadata generation, step 112. At step 114, the location of the object in the video frame is derived from a combination of the foreground object segmentation and object tracking process. At step 116, the size of the object in terms of the number of pixels across its width and height is derived. Deriving the width and height of the object may be achieved by establishing the maximum distance in pixels between boundaries of the object in the horizontal and vertical directions of the video frame. Additionally, the width and height of the object determines the size of a "bounding box" for the object, the bounding box providing a simple geometric representation of the bounds of the object within the video frame.

Another attribute of an object which forms a part of the metadata is its appearance which may simply be based upon a color model for the object. The appearance is derived at step 118. In the described embodiment, the color of an object is derived by splitting it into four contiguous horizontal segments and determining the primary color in each segment. In the described embodiment, the four contiguous horizontal segments are based on splitting the bounding box for the object. The primary color is identified by the video content analysis model 26 by simply counting the number of pixels of a particular hue within the segment and assigning the primary color to being that of the hue having the greatest number of pixels. The four primary color values, one for each segment, form the color model for the appearance attribute of the metadata.

For the described embodiment two classes of object are defined as being of interest for analysis; pedestrian and vehicle, and the class of an object is derived by comparing the shape and speed of the object against template data defining the pedestrian and vehicle shapes and determining whether or not there is a match. The class of object is derived at step 120. The direction and speed of an object is derived at step 122 and 124 respectively. Additionally, tracking confidence values are determined at step 125. The tracking confidence values are in respect of a confidence that the object to which an object ID is currently assigned is the correct object for that object ID, and that the track (i.e. location) is the correct track for the object. Any suitable tracking technique or algorithm may be used to track objects. Examples of techniques for tracking objects may be found in "Object Tracking: A Survey", Alper Yilmaz, Omar Javed & Mubarak Shah, ACM Computing Surveys, Vol. 38, No. 4, Article 13, December 2006.

The metadata record formed by the metadata attributes is then sent to the metadata database 28 at step 126. Process flow then returns to assigning an object ID to the next object in the frame. If there are no more objects to generate metadata for, the metadata records are sent to the metadata database 28 at step 102. Optionally, metadata records could be sent to the metadata database 28 at step 126 as each metadata record is completed.

Figure 7:
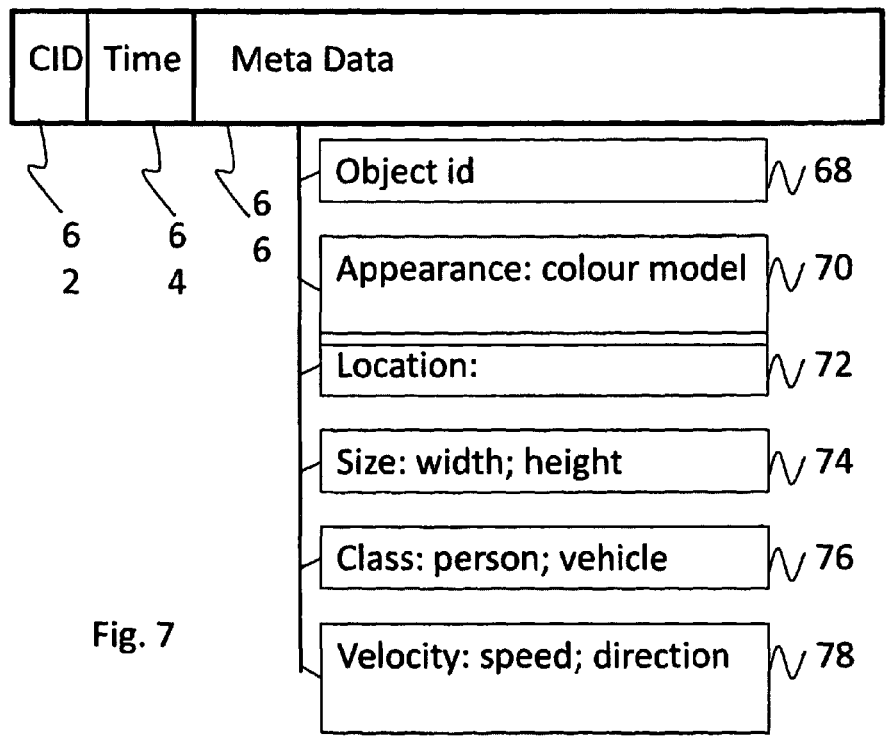
FIG. 7 is a diagrammatic representation of a metadata data element.

A diagrammatic representation of a metadata record 60 is illustrated in FIG. 7. As with the video image data element, a camera identity 62 and timestamp 64 are provided. In addition the metadata record 60 includes metadata 66. In the described embodiment, the metadata includes the following attributes, object ID 68; appearance 70; location 72; size 74; class 76; velocity 78 and tracking confidence values 79. Embodiments in accordance with aspects of the invention need not include all of the metadata attributes as described in the foregoing or may include other metadata attributes.

Figure 8:
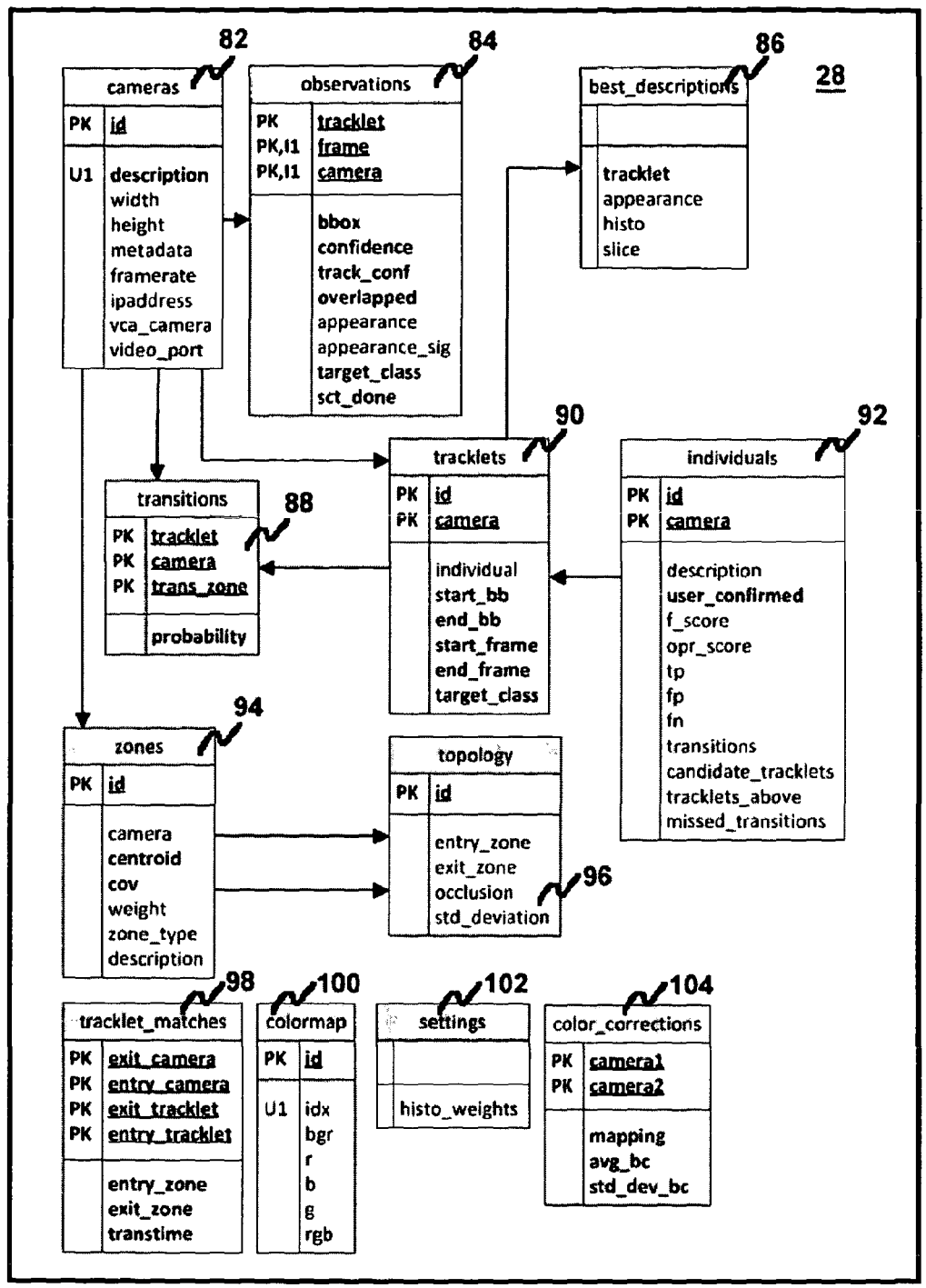
FIG. 8 is an entity relationship diagram for a metadata database in accordance with an embodiment of the present invention.

In the described embodiment, the metadata database 28 is a relational database and FIG. 8 illustrates an entity relationship (E-R) diagram for the data stored in the metadata database 28. The metadata database 28 comprises a number of tables containing related data. Not all the elements of the tables need to be described for a complete understanding of the present invention and only those relevant to the present description were described in any detail. The tables in the metadata database 28 and their entries will be in relation to the functions running on and associated with the metadata database 28 as described later.

Data relevant to each camera is kept in table 82 and is keyed on the basis of a camera identity and includes information regarding the camera such as a textual description of the camera location, the camera image dimensions in terms of its width and height, metadata such as 3D calibration details and other information about the camera. The observations table 84 comprises entries which correspond to the metadata of metadata record 60. For example, the bounding box "bbox" entry is based upon the size 74 and location 72 of an object, while the "appearance" entry 70 is based on the color model entry on the metadata record and the "target_class" entry is based on the class entry 76 in the metadata record. The confidence and track_conf entries to respond to be confidence values 79 of the metadata record element of 60. Entries for other tables will be described in relation to the functions that operate on and populate the metadata database 28.

Figure 9:
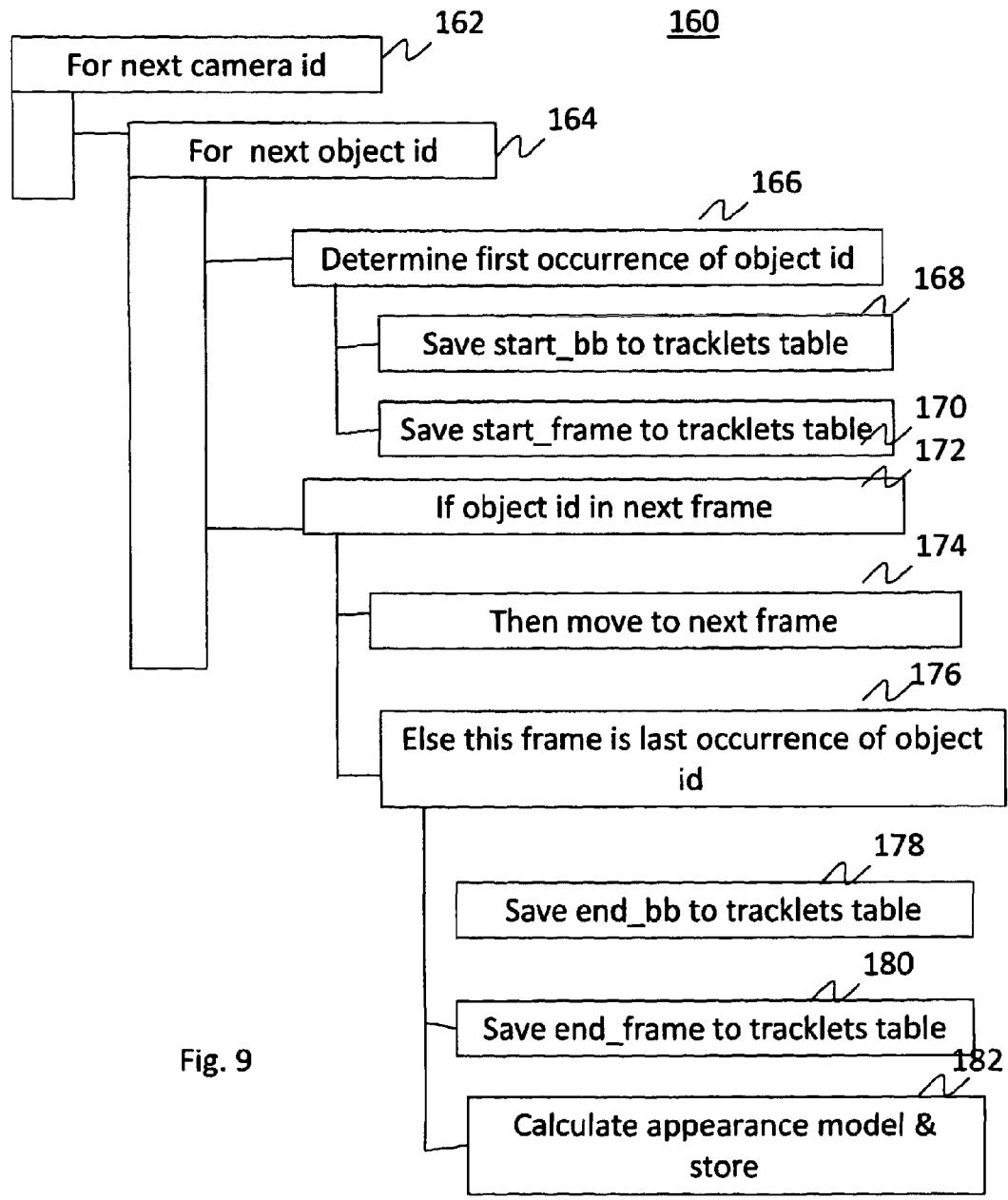
FIG. 9 is a process control flow diagram for determining a tracklet in accordance with an embodiment of the present invention.

Referring now to FIG. 9, there is illustrated a process flow control diagram 160 for the single camera tracker module 30. The single camera tracker module 30 operates on data in metadata database 28, namely observations table 84, and populates tables within that database with results of its operations. In general outline, the function of the single camera tracker module 30 is to define the track taken by an object in a view field in terms of a "tracklet". A tracklet has an identity corresponding to the object ID to which the tracklet relates. The tracklet is defined by the key parameters of the path taken by an object in a view field, namely where and when the object entered and exited that view field. A "tracklet" defines the behavior of an object within a view field. Data defining the tracklet is stored in the "tracklets" table 90. In this way, the behavior of an object in a view field may be characterized by way of a single attribute, namely the tracklet, thereby reducing the amount of data characterizing the behavior of an object in view field. That is to say, it is not necessary to analyze all the metadata attributes for an object when wishing to determine its behavior in a view field and moreover not necessary to analyze the video image data each time the behavior of an object is to be analyzed.

The creation of a tracklet involves an indexing process of the objects being tracked within all cameras in the video content analysis module 26. Such an indexing scheme may provide for fast searching for an object during the tag and track session and may be also exploited by other modules which may also interface with the metadata database 28.

The single camera tracker module 30 process starts at step 162 where the camera identity for the next view field to be analyzed is selected. The next object ID to be subjected to the analysis is then selected at step 164, which for the initial analysis will be the first object ID identified in the view field. The first occurrence of the object ID under analysis is determined at step 166 and the entry "start_bb" in table 90 is populated with the bounding box parameters corresponding to the first occurrence of the object in the view field at step 168. The bounding box parameters are the location and size of the bounding box. Additionally, the time corresponding to the first occurrence of the object in the view field is stored in the "start_frame" field of table 90 at step 170.

The next frame is analyzed to see if the same object ID is present, step 172, and if it is, analysis moves to the next frame, step 174. If the object ID is not present in the next frame, then the previous frame is determined as containing the last occurrence of that object, step 176. The bounding box parameters and time are stored in table 90 as "end_bb", step 178, and as "end_frame", step 180, entries respectively. At this point, step 182, the single camera tracker module 30 creates a summary of the object appearance by creating a histogram of the observed colors for each of the four slices and stores that in the "best_descriptions" table 86. The single camera tracker module process 30 then returns to step 164 for next object ID in the frame. Once all the objects identified for a camera have been analyzed, the single camera tracker module 30 process returns to step 162 were the next camera identity is selected in the single camera tracker now this is performed on the view field is for the next camera identity.

This part of the single camera tracker module 30 functionality may also be implemented as an inline process that operates on the metadata generated by the VCA modules before they are stored in the metadata database 28. This reduces the interaction with the database and only reports digested metadata in the form of "tracklets" which increases efficiency. This way the observations table will not be used. The process of creating tracklets is exactly the same with the difference that the observation data is accumulated in memory and dissuaded of when the track is terminated.

In an embodiment of the single camera tracker module 30, the tracklet may be created as soon as an object is observed in the scene. The start and end points are calculated and also the appearance description is derived by calculation or other means. With new observations of the object becoming available in real time, the end point and observation model are updated accordingly. This can all be done in the tracklets table.

The single camera tracker module 30 runs as a background process on the metadata database 28. Once a tracklet has been determined for a particular tracklet ID, the "SCT_done" field in table 84 is set to a true flag so that no further analysis is performed on the tracking data for that object ID.

The single camera tracker module 30 process may also correct errors in the results of the video content analysis module 26 such as incorrectly assigning an object identity to an object as a result of two objects coming together and then separating in the view field. The single camera tracker module 30 may use the velocity parameter of the metadata record 60 corresponding to the relevant object ID and frame number to determine any sudden changes in the direction of the tracklet. Such sudden changes of direction are likely to be indicative of a misidentification of an object and the single camera tracker module 30 may be configured to reassign object IDs to an object whose position is more consistent with the velocity determined for that the track so far.

The single camera tracker module 30 may also be responsible for the operational stability of the metadata database 28. As the throughput of the metadata is very high in a system like tag and track, the operational stability of the metadata database 28 needs to be maintained for days or even months. At intervals, the single camera tracker module 30 analyzes the metadata in "observations" and "tracklets" tables to find meaningless data and deletes it in order to gain space and computational efficiency of the overall system.

The frequency of the intervals may be defined by the user and may, for example, be every 10 seconds, every 10 minutes, every 10 hours or every 10 days. The frequency may be defined according to the situation or application.

In a network of single camera trackers, i.e., a collection of single camera trackers, the frequency may be defined individually on each single camera tracker as some cameras may have higher throughput than others.

This process of finding the meaningless metadata includes the use of certain pre-configured parameters within the single camera tracker. Such parameters include deletion of metadata records in the "observations" table once they are used to generate "tracklets" and also to delete "tracklets" which are shorter than minimum duration.

Since the single camera tracker module 30 runs as a continuous background process, it is likely that the tracklet determination is fully up-to-date, although it would not matter if it was not so since the process would run on archived data. However, there will be a significant population of tracklets within the metadata database 28. The single camera tracker module operates on each view field corresponding to each camera in the network. Additionally, the single camera tracker module may track more than one object in the field, each object having its own ID.

The operation of the automatic topology learner module 32 utilizes the information in the tracklets table 90 to derive entry and exit zones of each view field. An entry or exit zone is an area of a view field in which bounding boxes typically occur for the first time or for the last time and will correspond to areas of the view field for the start and end points of each object tracked by the video content analysis module 26 for each view field. The single camera tracker module 30 will have utilized entries in the observations table 84 to derive the start_bb and end_bb entries for the tracklets table 90 and the entry and exit zones will typically encompass the location values of the start_bb and end_bb entries.

Figure 10:
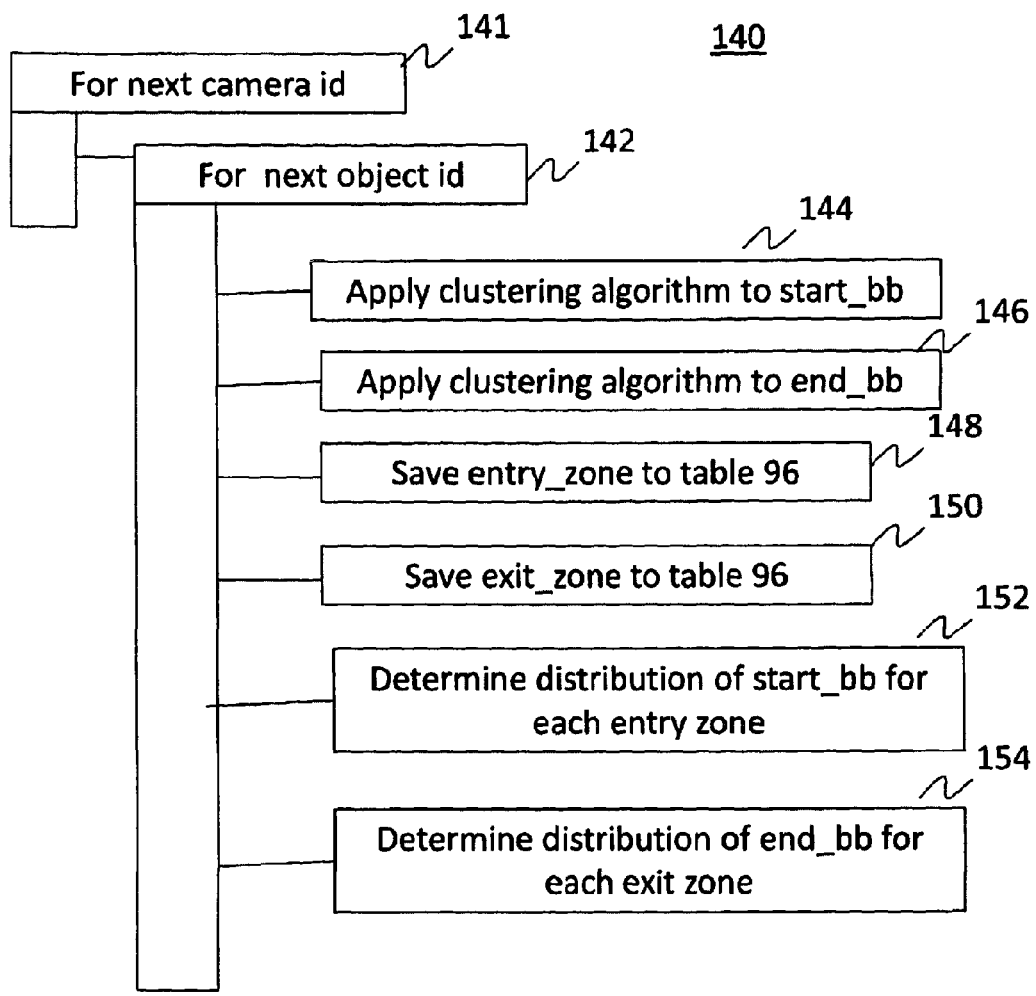
FIG. 10 is a process control flow diagram for determining exit and entry zones in accordance with an embodiment of the present invention.
Figure 11:
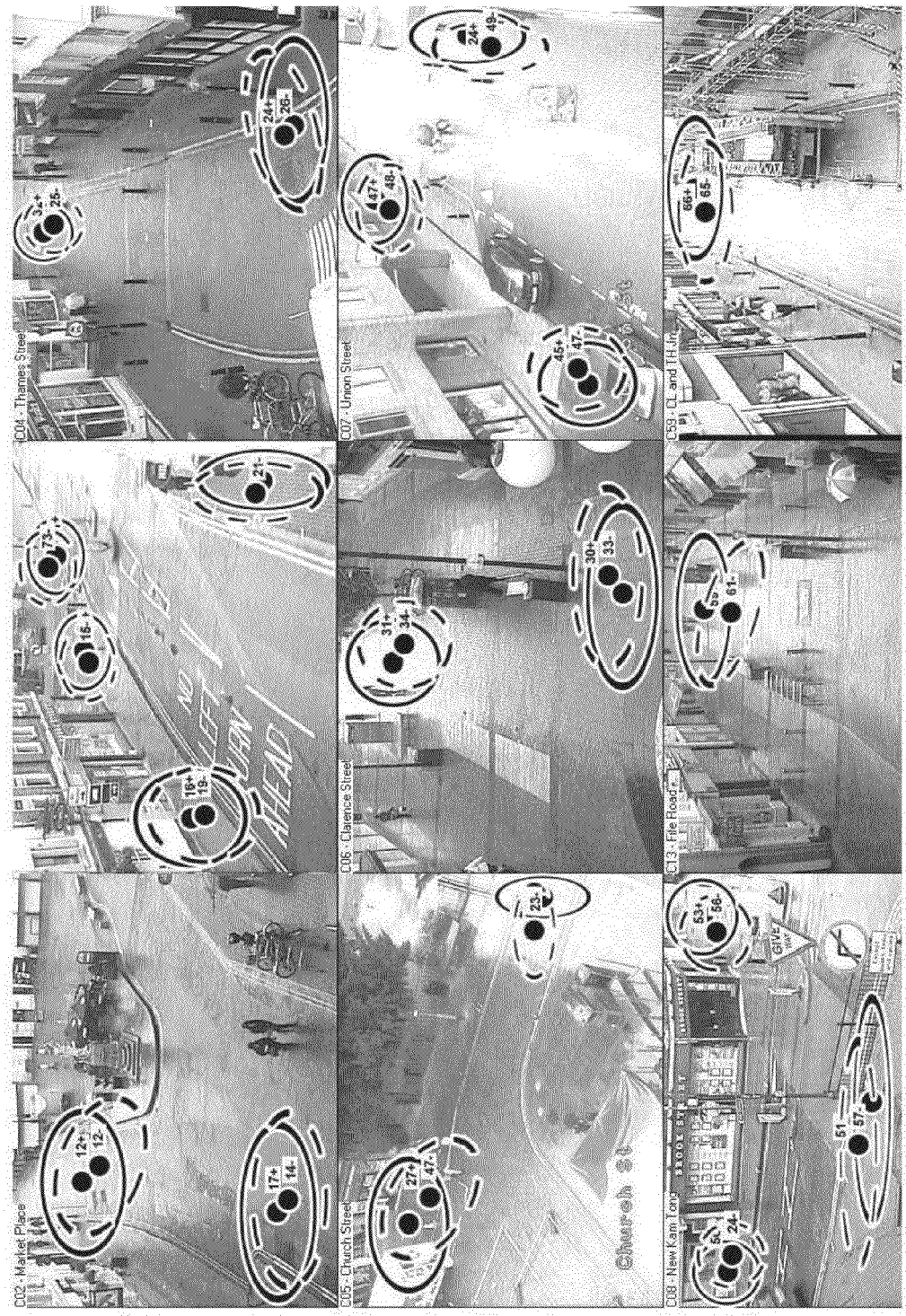
FIG. 11 is a photographic illustration having exit and entry zones superposed thereon derived from an embodiment of the invention.

Referring to the process flow control diagram 140 illustrated in FIG. 10, for each camera ID, i.e., camera view field, a clustering algorithm, for example expectation maximization, is applied to each of the starting point entries start_bb for each tracklet in table 90 to identify the major entry zones within the view field, step 144. A similar process is applied to the end_bb entries in the tracklets table 90 for the camera identity to identify the major exit zones in each camera view field, step 146. The entry and exit zones are saved to the zones table 94, steps 148 and 150, and each are modelled, for example, as a 2D Gaussian distribution on the image plane, steps 152 and 154, and stored with their standard deviation in the std deviation entry. 2D centroid, i.e., center, is also stored together with the statistical information concerning the size of the zone (co-variance) as well as the zone type, i.e., entry or exit zone. The standard deviation defines the area of the camera view field in which a track may start or exit. FIG. 11 illustrates the major entry and exit zones identified for an urban camera network. The solid circles represent exit zones and the broken circles represent entry zones. The circles may be color-coded to represent exit and entry zones.

Since each tracklet has an associated start and end time, (start_frame and end_frame in table 90), it is possible to identify the spatial links between exit regions in one camera field view and an entry region in another camera field view. The spatial links can be found by identifying a transition time model that is most consistent with respect to spatial and temporal constraints of the tracklet data. Typically, the transition time model will be based upon the spatial distance between the exit and entry zones and the speed of the object corresponding to the tracklet. An appropriate statistical distribution is applied to provide a spread of transition times between exit and entry zones based upon the speed of the object corresponding to the tracklet. The spread of the observed transition times is modeled using a histogram with a pre-defined range and a bin size. The bin size defines the granularity of the transition time in seconds and also affects the number of bins within the allowed range. The most voted bin is chosen as the transition time for an entry-exit zone link and a standard deviation for the transition time is calculated based on the most observed transition time. The relationships between pairs of entry and exit zones are stored in the topology table 96 which includes the standard deviation for the transition time between the respective pair of entry and exit zones. To avoid the use of outlier data in the estimation of transition time, at least one filter can be used during the transition time estimation process. Such a filter may include the use of appearance or a pre-defined time window.

Figure 12:
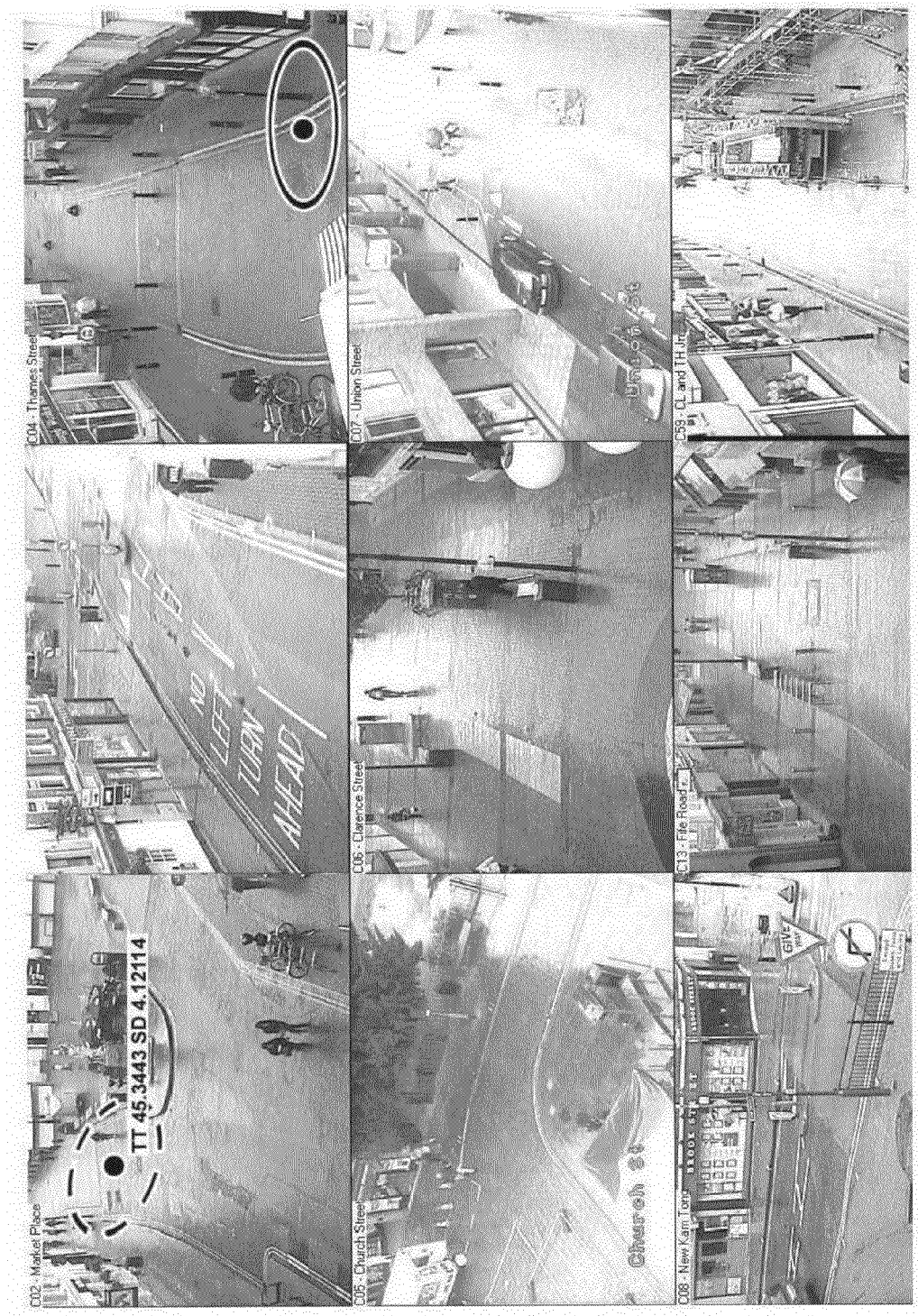
FIG. 12 is a photographic illustration of a pair of adjacent exit and entry zones derived from an embodiment of the invention.

FIG. 12 shows an example of transition time links generated between two spatially adjacent cameras. The solid circle represents an exit zone in one camera, and the broken circle represents the linked entry zone in the adjacent camera. The estimated transition time is shown in the camera field view for the entry zone. The transition time is modeled as a 1-D Gaussian distribution, for example, but may also be modeled using other statistical distributions.

The distribution of the transition time can also be derived from simulation of the environment of the network of cameras.

The automatic topology learner module 32 need not run as a background process, but may only run when the network topology needs updating. To address the situations of queues or porous routes within the camera network, where the transition time becomes variable thus making the most observed transition time consideration unusable, a multi-modal Gaussian distribution is used to capture a number of most observed transition times. Another approach used in such scenes is to estimate the dwell times of people/objects present in a queue in a timely fashion and store the transition times in the topology table.

A more detailed description of how transitions between camera field views may be modelled is provided in "Bridging the Gap between Cameras", D. Makris, T. Ellis, J. Black, IEEE Computer Society Conference on Computer Vision and Pattern Recognition, CVPR 2004; http://dircweb.kingston.ac.uk/papers/Makris_D.2004_729650/cvpr2004_BridgingtheGapsbetwee nCameras.pdf.

Figure 13:
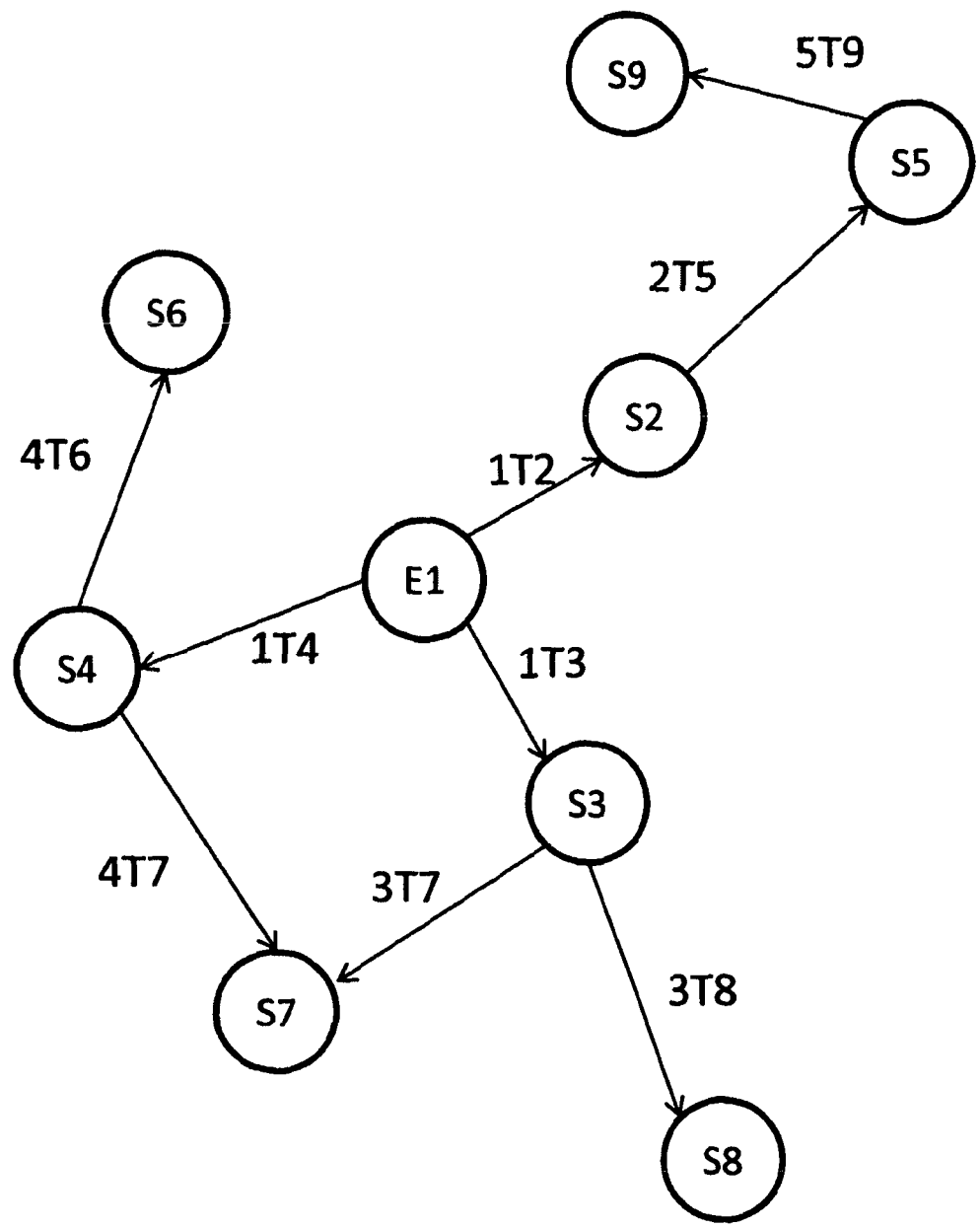
FIG. 13 is a schematic illustration of the topology of a video surveillance network in accordance with an embodiment of the invention.

A graphical illustration of a network topology created by the automated topology learning module 32 is illustrated in FIG. 13. The illustrated network comprises a plurality of nodes which are either exit or entry zones, or combined exit and entry zones for different camera view fields. The connections between nodes represent possible transitions with the transition times being represented as "OTE" where "O" is the originating node number and "E" is the terminating node number for the transition. The transition time includes the standard deviation value for the transition that by defining the spread window of time and object may take to between an exit and entry zone.

The multi camera tracker module 34 interfaces with both the metadata database 28 and the application programming interface 44. The multi camera tracker module 34 receives requests from user interface and analyzes metadata in a metadata database to generate tracking results for a tagged person/object. The results are then sent via the application programming interface 44 to the user interface. The multi camera tracker module 34 uses the indexed metadata stored as tracklets and invokes certain parallel processing techniques to perform a fast search for the person/object during the tracking process. The metadata database 28 stores certain procedures/methods to perform tracking and these procedures are executed by the multi camera tracker module 34 to generate the tracking results during a tag and track session. The tracking process involves the use of the camera topology information contained in both the "zones" and "topology" table.

In an embodiment, the tracking process employed in the multi camera tracker module 34 may be bi-directional, one in the forward direction and the other in the backward direction. In some instances of tagging, it can be assumed that the person/object has entered the tagging camera field of view from another camera and the transition has already happened. The same concept of past transition can be applied iteratively to hypothesize that the person/object has done several transitions in the past and that there is a starting point where the person/object would have entered the camera network. The objective of the backward tracking in the multi camera tracker module 34 is to compute the candidate tracklets backward in time until such time when there are no results available or a maximum number of transitions is reached during the computation. Conversely, the forward tracking process aims to find all candidate tracklets which are transitions and always are incremental in time. When the tag and track system is operating in archived mode, i.e., with reference to the tagged time of the object, if the metadata is available both forwards and backwards in time, both forward and backward tracking results would be computed and made available to the user interface. During the live mode of operation, i.e., with reference to the tagged time of the object, as the metadata is not available for future transitions of the person/object into other cameras, only the backward tracking results will be available.

Starting with node E1, the multi camera tracker module 34 may receive via the application programming interface 44 a request to track an object within the camera view field of the camera in which node E1 is an exit zone. The multi camera tracker module 34 analyzes the data in metadata database 28 to identify in other view fields tracklets which have a start frame within the transition time window for the entry/exit zone transition from node E1. In FIG. 1, these are transitions from node E1 to node S2, S3 and S4. Having established candidate tracklets which satisfy the spatial and time constraints corresponding to the object being tracked the multi camera tracker module 34 compares attributes concerning the object corresponding to each candidate tracklets with the attributes of a tracked object. In one embodiment, the tracking process within the multi camera tracker module 34 is a three-step process. The first step is to find a list of candidate tracklets that satisfy a topological link involving an exit zone in one camera and an entry zone within an immediate neighboring camera in terms of transition time stored in topology table for the link. The forward tracking phase is considered here for explanation.

During the tracking phase, a suitable metric, for example the Mahalanobis distance (MD_EXIT) between the tagged tracklet's end_bb and all the available exit zone co-variances is calculated. All topological links pre-defined from exit zones of the tagged camera into other camera(s) entry zones can be considered as possible transitional links for the tagged tracklet.

Once a shortlist of transitional links is computed, all tracklets starting in transitioned links which fall within the multiple of standard deviation of transition time in the corresponding topological link are considered as possible candidate transitional tracklets. Once such transitional tracklet list is generated, the Mahalanobis distance (MD_ENTRY) between each of the tracklet's start_bb and all existing entry_zones in the transitioned camera(s) are computed. Additionally at this stage, only tracklets belonging to the same object class as that of the tagged object are considered.

The second stage involves applying a pre-defined threshold on both MD_EXIT and MD_ENTRY values for tracklets computed in stage one. This will filter out tracklets which are not near the close proximity of either tagged camera exit zone or transitioned camera entry zone. A unified score (MD_TL) identifying the spatial and temporal relationship of the candidate tracklet with a topological link is computed and stored. All such tracklets in the list are sorted in descending order based on MD_TL and only a predefined number of tracklets from the list are passed to the third stage.

The third stage of the tracking process involves the computation of appearance matching and ranking based on appearance matching scores. The appearance histogram of each slice stored for the tagged tracklet in the best_descriptions table is matched to the corresponding slice histogram of the candidate tracklet from stage two and the process involves the computation of a suitable metric, for example, the Bhattacharya distance which will always be a value between 0 and 1.

Bhattacharya distance scores evaluated for all the four slices are averaged to deduce a final likelihood score during the appearance matching phase. Once such scores are available for all the candidate tracklets, the list is sorted in descending order based on the final likelihood score. At the end of this process, the tracklet at the top of the list will be the one most likely to be the best match to the tagged tracklet since it has the highest score and further down the list, the confidence decreases.

For example, the appearance of the object may be compared and/or size of the object and possibly its class. Depending upon the level of correspondence, a score such as likelihood or a probability score is determined reflecting the likelihood that the object in the candidate tracklets is the object it is intended to track.

For each of the ranked candidate tracklets evaluated based on the above process, one more iteration of the tracking process is applied to compute the next immediate transition. This process is repeated until the maximum number of transitions from the tagged camera is reached or when further transitions cannot be computed due to the non-presence of metadata. Based on the likelihood or probability score of the candidate tracklets, the highest scoring pre-defined number of transitions, for example, are established as the final candidate transitions. As per the above discussion, the tracking results computed as such to form a tree structure and are sent to the user interface embedded within a suitable data structure.

A user interface may be provided displaying the networked topology, for example, using a map of FIG. 1 and transitions plotted on that map. A user of the system may then call up the corresponding video for each of the entry zones in the final candidate transition list to visually inspect objects in the video. The user may confirm an object in one of the camera view fields to establish which transition is correct. In response to a user confirming a transition, the display is updated to show just that transition and up to four candidate routes from the confirmed entry node. Referring to FIG. 13, if the confirmed transition was from E1 to S2, the link between E1 and S2 is displayed together with the candidate routes from S2. The process is repeated for each node from which a tracked object may exit that an object may be tracked through a network until it leaves the network.

The operations on the user interface may refer to the visual inspection and confirmation/rejection phases carried out by the operator for the forward tracking results generated by the multi camera tracker module 34.

A similar operation may be carried out by the operator, using reversed chronology, for the backward tracking results and by the end of this process, the complete route taken by the tagged person/object will be available to the operator. A provision to generate a report in a readable format is accommodated in the user interface with either pictures or related video segments corresponding to individual tracks and further stored for evidential purposes.

The metadata operated on by the multi-camera tracker module 34 is related to stored video, i.e., past events. Therefore, the multi camera tracker module 34 may be configured to identify transitions corresponding to an entry into node E1 of the tagged object. In this way, both forwards and backwards candidate routes may be identified and verified for a tagged object. Thus, a user may select video to view such that they may observe the behavior of a tracked object both backwards and forwards of the node in which it was tagged.

Notably, the tagging and tracking of an object through the network, together with establishing confidence value for candidate tracks among other things, is achieved by analysis of the metadata attributes stored in the metadata database 28 and not in video image data itself. Therefore, there is less data processing and tagging and tracking can be achieved in real-time.

Figure 14:
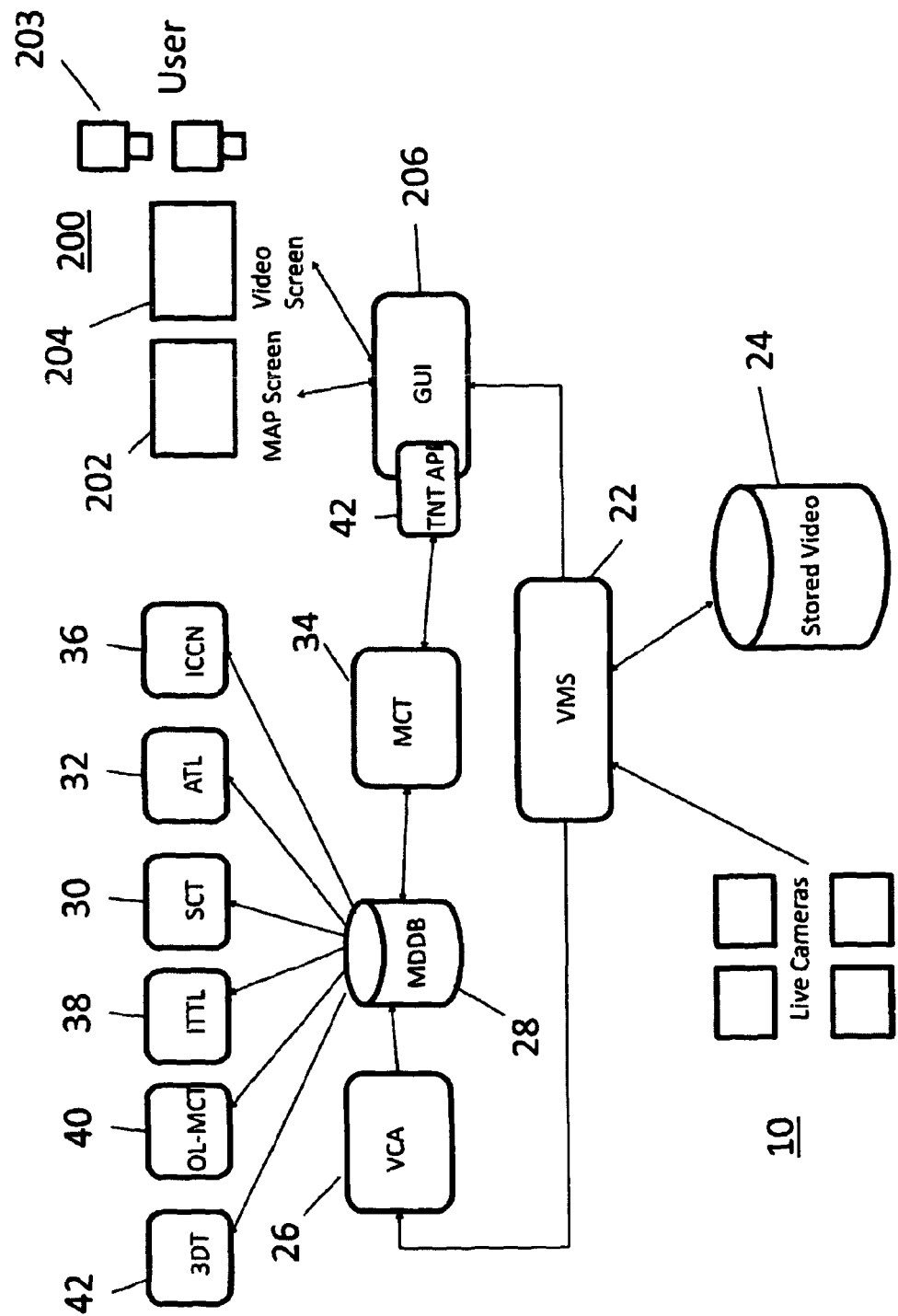
FIG. 14 is a schematic illustration of a surveillance system incorporating a tag and track user interface module in accordance with an embodiment of the invention.

In accordance with another aspect of the present invention, a tag and track graphical user interface module is provided that interfaces with the application program interface 42 for an embodiment of the invention. FIG. 14 illustrates a system incorporating a tag and track graphical user interface module 206. The graphical user interface module 206 drives a display 200 comprising a map screen 202 and a video screen 204. Such a display 200 is provided on respective display apparatus for use by a user at a control center 203.

The map screen 202 displays a map of the area covered by the video surveillance network, and the video screen 204 displays a video image of a scene for a camera selected by user on that screen 202.

The tag and track graphical user interface module 206 is configured to provide a user with the tools to tag an object of interest in a video scene, to provide a visual representation of the route that object may have taken within the area under surveillance and update a display of the route being taken by a tagged object in real-time.

FIG. 14 is a schematic illustration of the display 200 following a user invoking the tag and track user interface module 206. The map screen 202 displays the location of cameras in the surveillance network on a map of the area under surveillance as a series of nodes N1-N12. User actuable start tag and track button 302 and end tag and track button 304 are displayed, which when activated cause the tag and track user interface module 206 to begin and end tagging and tracking of a selected object respectively.

The video screen 204 displays a video scene corresponding to a selected camera node N1-N12. When the tag and track user interface module 206 is first invoked, the video scene may be of a default camera view field or the user may be provided with a screen message prompting selection of a camera. Within the video scene displayed on video screen 204 are a number of objects 310, 312 and 314. Each of the objects has a bounding box drawn around it, which serves to identify that the object has been the subject of analysis by the video content analysis module 26. Additionally, a toolbar 316 is displayed at the bottom of the screen. The toolbar 316 includes a time line 318 which includes a time pointer indicating the time stamp of the video being displayed. A user actuable "go to" button 320 is also displayed, which when actuated invokes the display of a calendar from which a user may select a particular day for which a video scene is to be displayed. Additionally, play 322 and pause 224 user actuable buttons are provided in order for a user to control playing of a video scene. A time slider 328 is displayed and may be moved under cursor control. Responsive to the cursor positioning on the time slider 328, the tag and track user interface module 206 requests corresponding video from the video server 22 at a speed relative to the location of the cursor on the slider. This allows the user to play the video at different speeds to accelerate the video navigation process.

A pointing device such as a computer mouse may be provided for a user to control a cursor on the map screen 202 and video screen 204. Optionally, one or more of the screens may be touch sensitive. In order to tag an object, the user selects one of the objects displayed on video screen 204 such as by moving a cursor over it and pressing a button on the mouse control or simply by touching the screen if it is touch sensitive. The timeline includes bookmarks 326 and 327 indicating when the tagged object entered and exited respectively the view field of the camera corresponding to the displayed scene.

Figure 15:
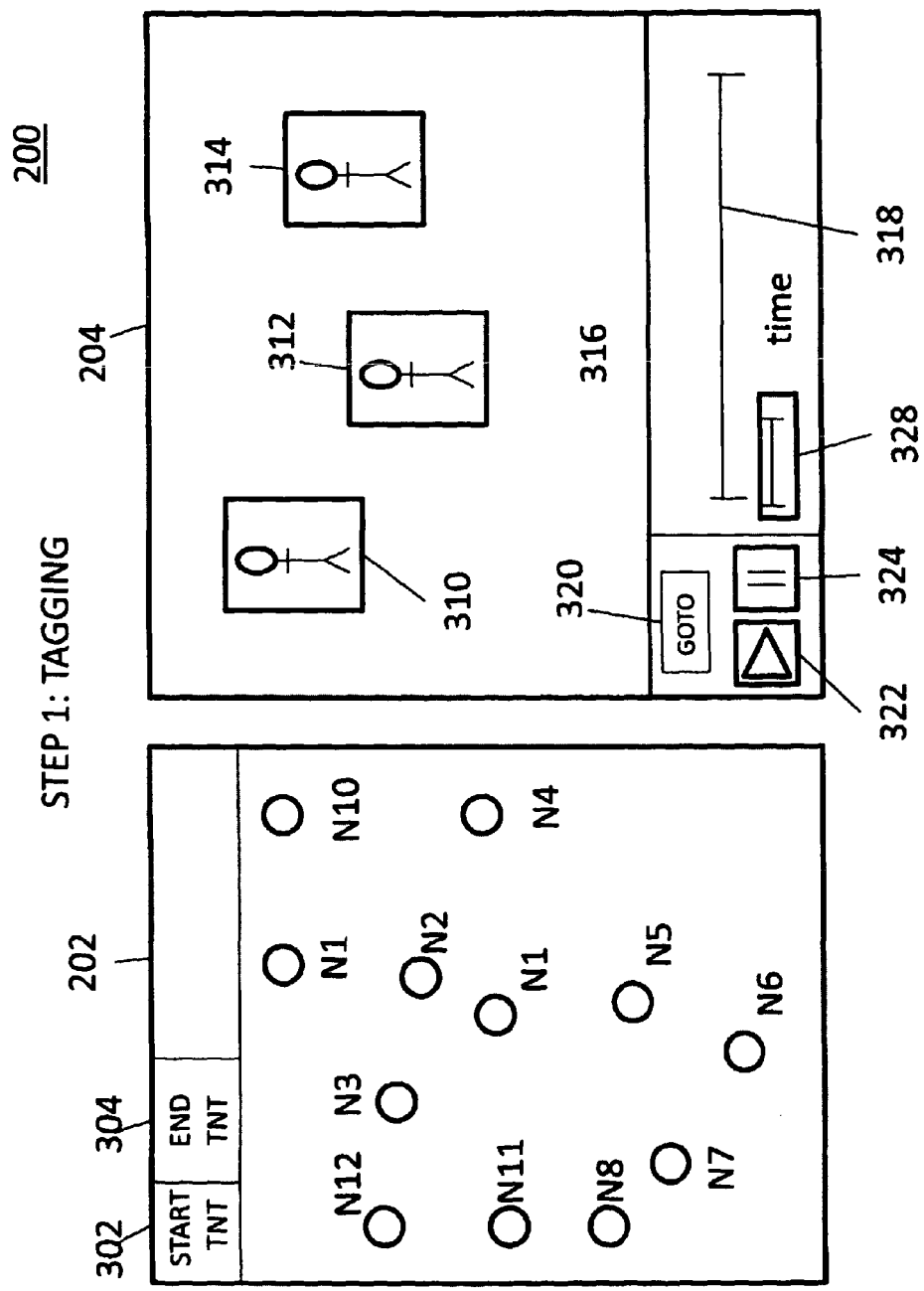
FIG. 15 is a schematic illustration of a first stage of a user interface display in accordance with an embodiment of the invention.

Turning now to FIG. 15, there is a graphical illustration of the display 200 following tagging of object 312. The tagged object of 312 is highlighted.

Map screen 202 is updated to show possible routes that object 312 may have taken through the surveillance network both in a forwards and backwards direction from the camera view field (N1 in FIG. 15) in which the object was tagged by the user. In the described embodiment, up to four transitions between camera nodes in respective forward and backward directions are displayed. The camera location node, N8, corresponding to the list of video scene is highlighted, which in the illustrated figure comprises a dotted circle and solid circle. The node, N1, corresponding to the camera location for which the object was tagged is highlighted in the illustrated figure by a single solid concentric ring, while the end of the displayed route, N14, is highlighted with dotted and dashed lines in a ring and solid outer ring. The route from node N8 through to node N14 is displayed in solid lines indicating that the tag and track system has determined this to be the most probable route for the tagged object 312. Less probable routes may be indicated in a dotted outline and comprise the possibility that the tagged object 312 originated from node N11 before entering node N1, and also that the object may have left node N1 to go to node N3, for example.

The user may select a camera location corresponding to one of the nodes on the displayed route in order to confirm whether or not the tagged object does appear in a scene corresponding to the camera location view field for that node. Typically, a user will select a camera location node on the solid line since that is the most likely route.

Figure 16:
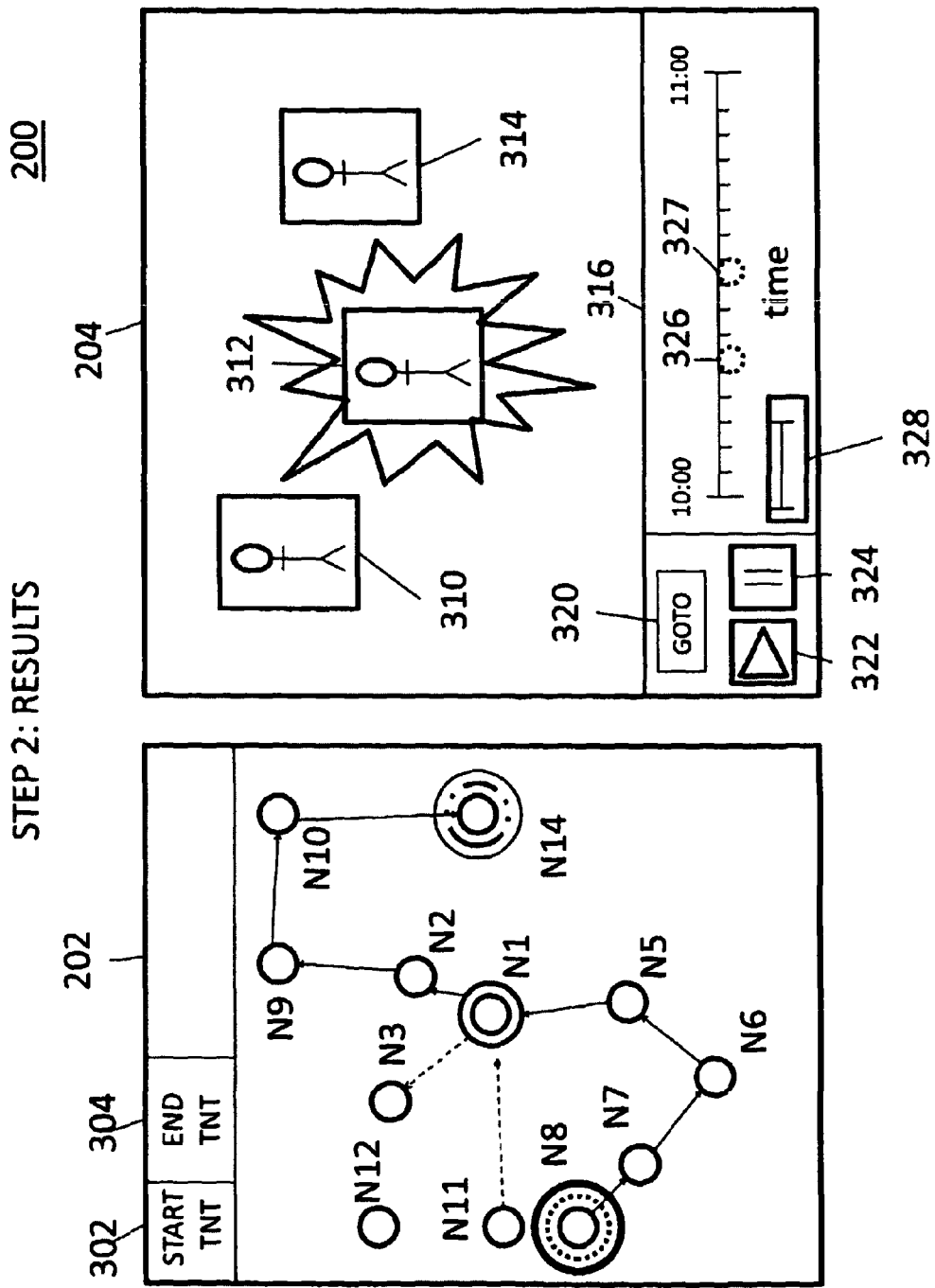
FIG. 16 is a schematic illustration of a second stage of a user interface display in accordance with an embodiment of the invention.

FIG. 16 illustrates the display 200 following a user selecting the camera location corresponding to node N9. Video screen 204 displays a video scene corresponding to the camera view field at location N9. In the illustrated example, there are four objects in the video scene, 350, 352, 354 and 356. The object considered by the video content analysis module 26 to correspond to the object tagged by the user is highlighted, which in the illustrated example is object 356.

The timeline 316 displays six bookmarks, three of which, 358, 360, and 362, correspond to the objects' entry time into the view field which are within the transition time window for an object originating from the camera view field corresponding to node N1. The remaining three bookmarks, 364, 366 and 368, correspond to the objects exit time from the view. The bookmarks corresponding to the highlighted object, 362 and 364, are also highlighted. The bookmarks correspond to the tracklet start_frame and end_frame entries in the tracklet table 90.

The map screen 202 has been updated to indicate the camera location, N9, currently selected, and also to indicate possible routes into and away from that camera location based upon the tag and track system analysis of the metadata stored in the metadata database 28. As can be seen in the illustrated example, the same route is considered to be the most likely route.

Figure 17:
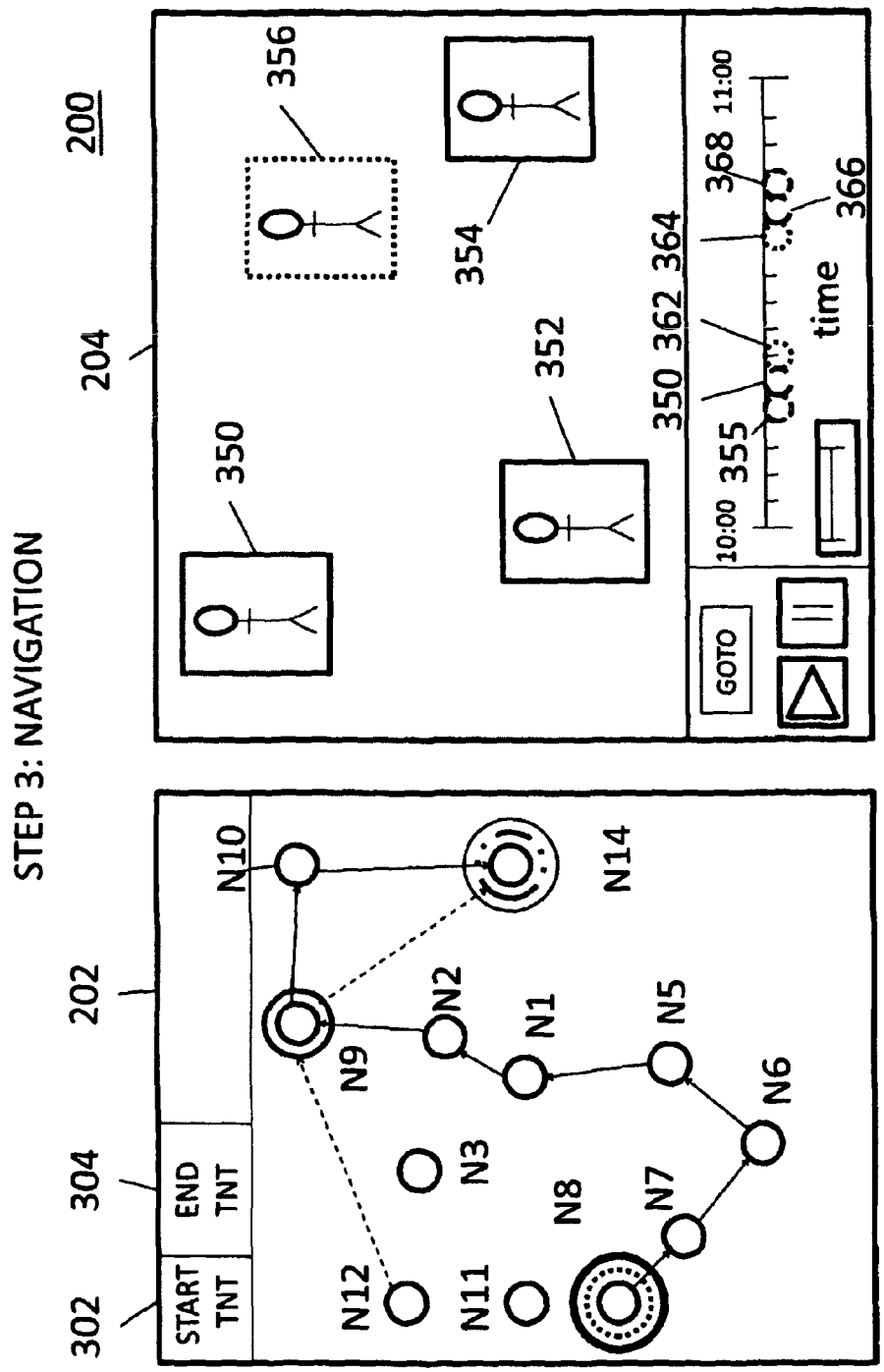
FIG. 17 is a schematic illustration of a third stage of a user interface display in accordance with an embodiment of the invention.
Figure 18:
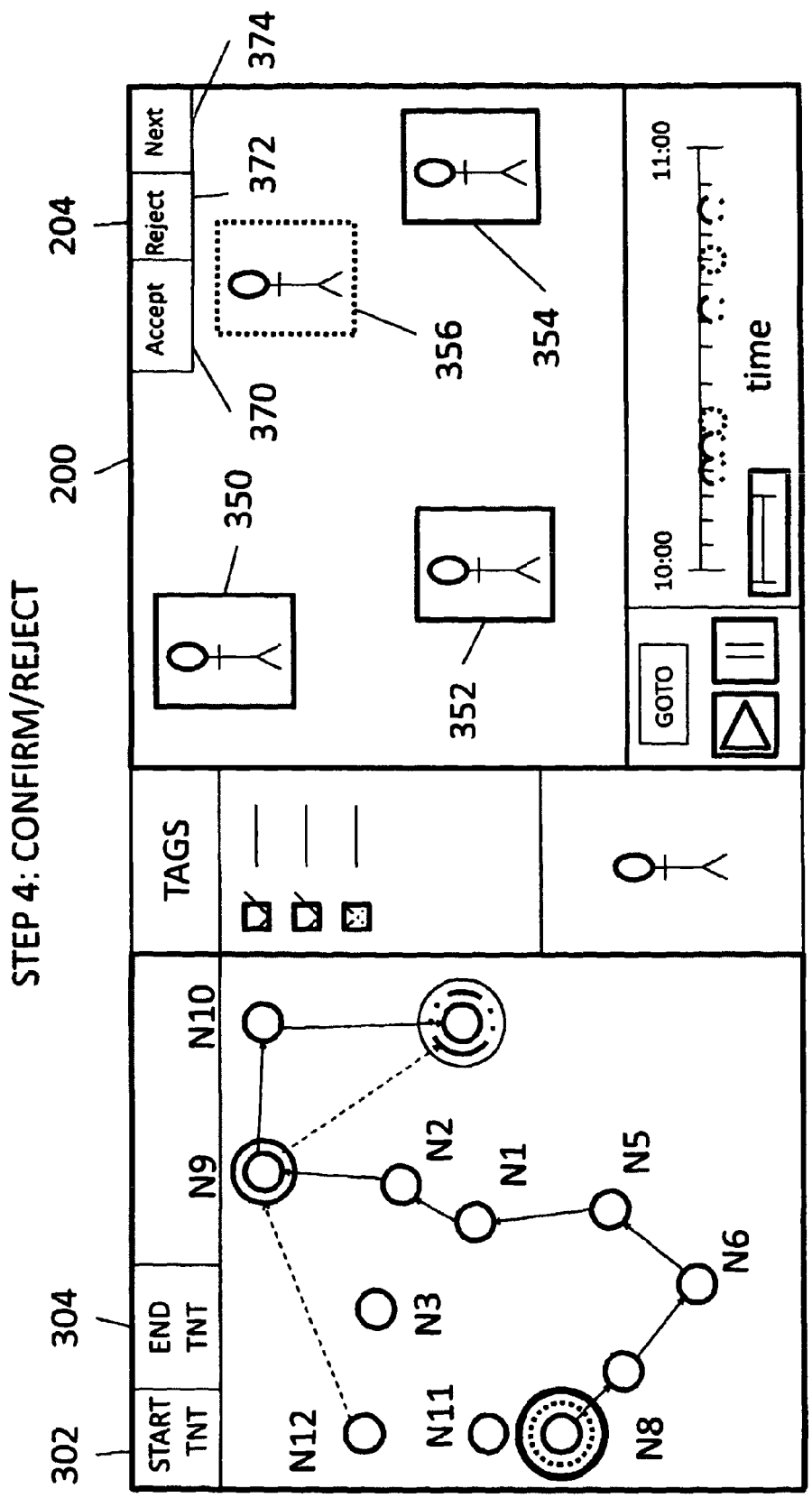
FIG. 18 is a schematic illustration of a fourth stage of a user interface display in accordance with an embodiment of the invention.

A user may invoke a confirmation/rejection display, for example, by moving the cursor over and clicking on the highlighted node corresponding to the currently displayed camera view field scene. Other user commands may be available to invoke the confirmation/rejection display. FIG. 17 illustrates the camera map, which remains unchanged from the previous display, and the video screen 204 which now displays three further user actuable buttons, Accept 370, Reject 372 and Next 374. A user may confirm that object 356 does correspond to the tagged object, for example, by determining that the object looks the same, by clicking the Accept button 370. Optionally, a user may reject the highlighted object by actuating the Reject button 372. By actuating the Next button 374, the user may highlight another object displayed on display 200 and confirm or reject them as corresponding to the tagged object.

If the user clicks the Reject button 372 and there are candidate tracklets available for the present transition, the next best matched tracklet is displayed/highlighted both on the map screen and on the confirmation/rejection display.

Alternatively, if there are no candidate tracklets available for the present transition, a request is sent to the multi camera tracker module 34 to discard the current result (track of the object) and may invoke a tracking process which generates more results.

If a further tracking process is invoked, the tracking process will set a higher standard deviation for the transition time to include more candidate tracklets which are presented to the user again. Additionally, an Untag button is present which the user can use to correct a mistake during the confirmation/rejection phase of a result. In case the user makes a mistake by incorrectly clicking the Reject button for a correct result and vice-versa, he can click on the Untag button to change the state of the result to a neutral state after which he can take the right action. The untag operation is not dependent on the time at which an incorrect decision has been made with a result but is limited to a tracking session.

Although an embodiment in accordance with the present invention has been described with reference to stored video, hence possible routes go forward in time from a selected camera location node, the system may be configured to provide real-time display of possible routes. For example, the multi-camera tracker module 34 runs continuously and therefore may update the metadata database 28 with new information relevant to the tag and track operation being undertaken by the tag and track user interface module 206. Thus, for the next update of map screen 202 the new metadata is utilized to provide an updated display of where the possible tagged object may be within the video surveillance network.

In a network of cameras, it is likely that each camera has a different color signature. This may be due to manufacturing tolerances, the use of different components or very possibly, different lighting conditions between cameras. The intra color normalization module 36 operates to transform color between cameras using the existing metadata for cameras on a pairwise basis which are linked according to the camera topology information and automatically deduces information required for performing color normalization during the tracking process.

It may also be desirable to understand the behavior of objects within a camera view field and the intra camera policy module 38 determines behavior of objects within a camera view field. For example, it may determine where an object enters and leaves the view field and what the object does within the view field. This may be important where there are entry and exit zones within a view not having corresponding entry and exit zones in the view field of another camera, such as where there is an entry and exit point for a shop within the same view field.

Multi camera tracking may be carried out continuously as a background function such that objects are tagged and tracked without a user first tagging an object. This functionality is performed by the off-line multi camera tracker 40 and can improve the speed and accuracy of establishing tagged routes. The off-line multi camera tracker 40 creates the individuals table which link tracklets belonging to an individual object.

The 3DT module 42 addresses environments where cameras overlap and a 3-dimensional calibration is necessary in order to establish and identify tracks for different camera view fields as being the same object based on the three-dimensional geometry. This module analyzes the tracklets tables, uses the known 3D calibration of each camera to project these tracklets onto a ground plane and hence compares the individual tracklets to identify the cases where such tracklets represent the same individual seen from two or more cameras with overlapped view fields. When such tracklets are identified, the matched tracklet pairs are stored in the tracklets matches table. The Multi camera tracker module 34 will use this information to link tracklets between overlapped cameras with 3D calibration information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention. For example, a list of candidate routes need not be limited to four candidate routes but may comprise fewer or more candidate routes.

The scope of the present disclosure includes any novel feature or combination of features disclosed therein either explicitly or implicitly or any generalization thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. An apparatus comprising:
a processor; and
a memory storing instructions executable by the processor, the instructions when executed cause the processor to:
analyze a sequence of video frames of a camera view field to track an object in said view field;
determine start and end points of said track in said view field;
determine start and end times for said track corresponding to said start and end points respectively;
store said start and end points and said start and end times as attributes of said track;
determine a temporal relationship between an end time of a track in a first view field and a start time of a track in a second view field;
determine, based on said temporal relationship, a likelihood value of a transition of said track in said first view field to said track in said second view field; and
store said likelihood value,
the memory further comprising instructions executable by the processor, the instructions when executed further causes the processor to track, on a sequence of video frames of a plurality of surveillance network camera view fields, an object in respective view fields and store respective start and end points and start and end times as attributes of each said track for respective view fields.

2. The apparatus according to claim 1, wherein said temporal relationship is based upon a spatial relationship in physical space between a start point corresponding to said start time and an end point corresponding to said end time.

3. The apparatus according to claim 1, wherein the memory further comprises instructions executable by the processor, the instructions when executed further causes the processor to:
track plural objects in said first and second view fields and determine corresponding plural start and end points;
determine start and end zones for said first and second view fields based on said plural start and end points;
determine said temporal relationship between an end zone of a track in said first view field and a start zone of a track in said second view field; and
determine, based on said temporal relationship, said likelihood value of a transition of said track in said first view field to said track in said second view field.

4. The apparatus according to claim 3, wherein said temporal relationship is based upon a spatial relationship in physical space between said start zone and said end zone.

5. The apparatus according to claim 3, wherein the memory further comprises instructions executable by the processor, the instructions when executed further causes the processor to respond to tagging of said object in said first view field to determine one or more tracks having start times in said second window satisfying said temporal relationship and display said one or more tracks to a user.

6. The apparatus according to claim 5, wherein the memory further comprises instructions executable by the processor, the instructions when executed further causes the processor to determine an appearance of said object as an attribute of said object and to compare the appearance attribute of each object corresponding to said one or more tracks to determine a probability value for each object being the tagged object and to rank said one or more tracks in accordance with said probability value.

7. The apparatus according to claim 6, wherein the memory further comprises instructions executable by the processor, the instructions when executed further causes the processor to only display the most likely tracks.

8. The apparatus according to claim 6, wherein the memory further comprises instructions executable by the processor, the instructions when executed further causes the processor to select a correct track responsive to user input confirming a one of said one or more tracks as a correct track.

9. A video surveillance system comprising a plurality of video cameras and an apparatus, the apparatus comprising:
 a processor; and
 a memory storing instructions executable by the processor, the instructions when executed cause the processor to:
  analyze a sequence of video frames of camera view fields of each of the plurality of video cameras to track an object in said view fields;
  determine start and end points of said track in said view fields;
  determine start and end times for said track corresponding to said start and end points respectively;
  store said start and end points and said start and end times as attributes of said track;
  determine a temporal relationship between an end time of a track in a first view field and a start time of a track in a second view field;
  determine, based on said temporal relationship, a likelihood value of a transition of said track in said first view field to said track in said second view field; and
  store said likelihood value,
  the memory further comprising instructions executable by the processor, the instructions when executed further causes the processor to track, on a sequence of video frames of a plurality of surveillance network camera view fields of the plurality of video cameras, an object in respective view fields and store respective start and end points and start and end times as attributes of each said track for respective view fields.

10. A method of operating data processing apparatus, the method comprising:
 analyzing a sequence of video frames of a camera view field to track an object in said view field;
 determining start and end points of said track in said view field;
 determining a start and end time for said track corresponding to said start and end points respectively;
 storing said start and end points and said start and end times as attributes of said track;
 determining a temporal relationship between an end time of a track in a first view field and a start time of a track in a second view field;
 determining a likelihood value of a transition of said track in said first view field to said track in said second view field based on said temporal relationship; and
 storing said likelihood value;
 the method further comprising operating on a sequence of video frames of a plurality of surveillance network camera view fields to track an object in respective view fields and storing respective start and end points and start and end times as attributes of each said track for respective view fields.

11. The method of claim 10, wherein said temporal relationship is based upon a spatial relationship in physical space between a start point corresponding to said start time and an end point corresponding to said end time.

12. The method of claim 10, further comprising:
 tracking plural objects in said first and second view fields and determining corresponding plural start and end points;
 determining start and end zones for said first and second view fields based on said plural start and end points;
 determining said temporal relationship between an end zone of a track in said first view field and a start zone of a track in said second view field; and
 determining said likelihood value of a transition of said track in said first view field to said track in said second view field based on said temporal relationship.

13. The method of claim 12, wherein said temporal relationship is based upon a spatial relationship in physical space between said start zone and said end zone.

14. The method of claim 12, further comprising responding to tagging of said object in said first view field to determine one or more tracks having start times in said second window satisfying said temporal relationship and display said one or more tracks to a user.

15. The method of claim 14 further comprising determining an appearance of said object as an attribute of said object and comparing the appearance attribute of each object corresponding to said one or more tracks to determine a probability value for each object being the tagged object and ranking said one or more tracks in accordance with said probability value.

16. The method of claim 15, further comprising displaying only the most likely tracks.

17. The method of claim 15, further comprising selecting a correct track responsive to user input confirming a one of said one or more tracks as a correct track.

\* \* \* \* \*